United States Patent
Khoshnevisan et al.

(10) Patent No.: US 12,219,596 B2
(45) Date of Patent: ***Feb. 4, 2025

(54) MANAGEMENT OF SINGLE-SHOT HARQ-ACK CODEBOOKS ALONG WITH HARQ-ACK CODEBOOKS WITH SET PRIORITY LEVELS

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,249

(22) Filed: Nov. 8, 2023

(65) Prior Publication Data

US 2024/0306182 A1 Sep. 12, 2024

Related U.S. Application Data

(63) Continuation of application No. 17/355,070, filed on Jun. 22, 2021, now Pat. No. 11,844,103.

(Continued)

(51) Int. Cl.
*H04W 72/56* (2023.01)
*H04L 1/1812* (2023.01)
(Continued)

(52) U.S. Cl.
CPC ........... *H04W 72/56* (2023.01); *H04L 1/1812* (2013.01); *H04L 5/001* (2013.01); *H04W 72/21* (2023.01); *H04W 72/23* (2023.01)

(58) Field of Classification Search
CPC ... H04L 1/1614; H04L 1/1664; H04L 1/1812; H04L 1/1854; H04L 1/1896; H04L 5/001; H04W 72/21; H04W 72/23; H04W 72/56
See application file for complete search history.

(56) References Cited

U.S. PATENT DOCUMENTS 8,488,549 B2 7/2013 Yang et al.
9,055,568 B2 6/2015 Yang et al.
(Continued)

FOREIGN PATENT DOCUMENTS

CN 102918793 A 2/2013
CN 109889316 A 6/2019
(Continued)

OTHER PUBLICATIONS

Ericsson: "HARQ Enhancement," 3GPP Draft, 3GPP TSG-RAN WG1 Meeting #101-e, R1-2003845 , 3rd Generation Partnership Project (3GPP), Mobile Competence Centre, 650, Route Des Lucioles, F-06921, Sophia-Antipolis Cedex, France, vol. RAN WG1, No. e-Meeting; May 25, 2020-Jun. 5, 2020, May 16, 2020 (May 16, 2020), XP051885614, 9 pages, sections 2.2.3 and 2.3.1.
(Continued)

*Primary Examiner* — Eric Nowlin
(74) *Attorney, Agent, or Firm* — Loza & Loza, LLP

(57) ABSTRACT

Aspects relate to configuring and managing hybrid automatic repeat request (HARQ)-acknowledgment (ACK) feedback codebooks for use in wireless communication systems. The HARQ-ACK codebooks include priority-based HARQ-ACK codebooks of differing priorities, such as Type 1 and Type 2 codebooks, and one-shot (Type 3) HARQ-ACK codebooks. In one example, a wireless communication device may be configured to obtain a set of HARQ-ACK codebooks that include priority-based HARQ-ACK codebooks of differing priorities and a separate one-shot HARQ-ACK codebook. The wireless communication (Continued)

device may further be configured to process first and second physical uplink channels based on the priority of the first physical uplink channel and the priority of the second physical uplink channel, where one of the two physical uplink channels includes the one-shot HARQ-ACK codebook, and with the processing performed in combination with the use of the priority-based HARQ-ACK codebooks.

22 Claims, 21 Drawing Sheets

Related U.S. Application Data

(60) Provisional application No. 63/043,725, filed on Jun. 24, 2020.

(51) Int. Cl.
*H04L 5/00* (2006.01)
*H04W 72/21* (2023.01)
*H04W 72/23* (2023.01)

(56) References Cited

U.S. PATENT DOCUMENTS

| | | | |
|---|---|---|---|
| 10,225,826 | B2 | 3/2019 | Tiirola et al. |
| 10,397,910 | B2 | 8/2019 | Lei et al. |
| 10,721,787 | B2 | 7/2020 | Chen et al. |
| 10,972,225 | B2 | 4/2021 | Khoshnevisan et al. |
| 10,993,218 | B2 | 4/2021 | Lei et al. |
| 11,044,708 | B2 | 6/2021 | Xu |
| 11,252,753 | B2 | 2/2022 | Chen |
| 11,297,642 | B2 | 4/2022 | Chin et al. |
| 11,382,121 | B2 | 7/2022 | Marinier et al. |
| 11,405,139 | B2* | 8/2022 | Tsai ............... H04L 1/1812 |
| 11,706,000 | B2 | 7/2023 | Sun et al. |
| 11,729,770 | B2* | 8/2023 | Tiirola ............ H04W 28/26 370/252 |
| 11,844,103 | B2* | 12/2023 | Khoshnevisan ...... H04L 1/1896 |
| 2012/0002568 | A1 | 1/2012 | Tiirola et al. |
| 2012/0320805 | A1 | 12/2012 | Yang et al. |
| 2013/0286905 | A1 | 10/2013 | Yang et al. |
| 2015/0237619 | A1 | 8/2015 | Yang et al. |
| 2017/0289972 | A1 | 10/2017 | Lei et al. |
| 2018/0279291 | A1 | 9/2018 | Tiirola et al. |
| 2019/0158252 | A1* | 5/2019 | Li ................... H04W 76/27 |
| 2019/0306841 | A1 | 10/2019 | Huang et al. |
| 2019/0364550 | A1 | 11/2019 | Lei et al. |
| 2020/0137695 | A1 | 4/2020 | Papasakellariou |
| 2020/0154469 | A1 | 5/2020 | Chin et al. |
| 2020/0220663 | A1* | 7/2020 | Tsai ............... H04L 1/1822 |
| 2020/0228248 | A1 | 7/2020 | Islam et al. |
| 2020/0305147 | A1 | 9/2020 | Lee et al. |
| 2020/0313816 | A1 | 10/2020 | Sun et al. |
| 2020/0366415 | A1 | 11/2020 | Khoshnevisan et al. |
| 2020/0382997 | A1 | 12/2020 | Nemeth et al. |
| 2021/0144580 | A1 | 5/2021 | Alfarhan et al. |
| 2021/0314104 | A1 | 10/2021 | Yin et al. |
| 2021/0328728 | A1 | 10/2021 | El Hamss et al. |
| 2021/0410155 | A1* | 12/2021 | Khoshnevisan ...... H04W 72/21 |
| 2022/0045801 | A1 | 2/2022 | Wang |
| 2022/0078768 | A1 | 3/2022 | El Hamss et al. |
| 2022/0104259 | A1* | 3/2022 | Li ................... H04W 74/0816 |
| 2022/0158769 | A1 | 5/2022 | Gou et al. |
| 2022/0231795 | A1* | 7/2022 | Lei ................. H04L 1/1614 |
| 2022/0248411 | A1 | 8/2022 | Jung et al. |
| 2022/0407631 | A1 | 12/2022 | El Hamss et al. |
| 2022/0416953 | A1* | 12/2022 | Li ................. H04L 1/1854 |
| 2023/0031360 | A1 | 2/2023 | Zhang et al. |
| 2023/0048080 | A1 | 2/2023 | Takahashi et al. |
| 2023/0064087 | A1* | 3/2023 | Yin ................ H04L 1/1854 |
| 2023/0077055 | A1 | 3/2023 | Gou et al. |
| 2023/0155720 | A1* | 5/2023 | Yin ................ H04L 1/0013 370/329 |
| 2023/0291508 | A1* | 9/2023 | Blankenship ........ H04L 1/1854 |
| 2023/0299891 | A1* | 9/2023 | Kittichokechai ..... H04L 1/1896 370/336 |
| 2024/0306182 | A1* | 9/2024 | Khoshnevisan ...... H04W 72/56 |

FOREIGN PATENT DOCUMENTS

| | | | | |
|---|---|---|---|---|
| CN | 110708146 | A | | 1/2020 |
| CN | 105827365 | B | | 4/2020 |
| CN | 111373678 | A | * | 7/2020 ......... H04L 1/1664 |
| CN | 111756493 | A | | 10/2020 |
| CN | 113812104 | A | * | 12/2021 ........ H04L 1/1621 |
| CN | 115039482 | A | * | 9/2022 ......... H04L 1/1854 |
| CN | 115804215 | A | * | 3/2023 ......... H04L 1/0013 |
| EP | 2409438 | B1 | | 10/2021 |
| EP | 3952178 | A1 | | 2/2022 |
| EP | 3970295 | B1 | * | 10/2023 ........ H04L 1/1621 |
| EP | 4283900 | A2 | * | 11/2023 ........ H04L 1/1621 |
| KR | 20130113917 | A | | 10/2013 |
| KR | 20210137577 | A | | 11/2021 |
| KR | 20220007724 | A | * | 1/2022 |
| KR | 20230025789 | A | * | 2/2023 |
| KR | 20230044295 | A | * | 4/2023 |
| WO | WO-2012044115 | A2 | | 4/2012 |
| WO | WO-2012044115 | A3 | | 5/2012 |
| WO | WO-2019099895 | A1 | * | 5/2019 ......... H04L 1/1664 |
| WO | 2019194589 | A1 | | 10/2019 |
| WO | WO-2020192609 | A1 | | 10/2020 |
| WO | WO-2020205226 | A1 | | 10/2020 |
| WO | WO-2020257692 | A1 | | 12/2020 |
| WO | WO-2021161720 | A1 | * | 8/2021 ......... H04L 1/1854 |
| WO | WO-2021211051 | A1 | | 10/2021 |
| WO | WO-2021227142 | A1 | | 11/2021 |
| WO | WO-2021262901 | A1 | * | 12/2021 ........ H04L 1/1812 |
| WO | WO-2022009702 | A1 | * | 1/2022 ......... H04L 1/0013 |
| WO | WO-2022024032 | A1 | * | 2/2022 ......... H04L 1/1854 |
| WO | WO-2022024047 | A1 | * | 2/2022 ......... H04L 1/1664 |

OTHER PUBLICATIONS

International Preliminary Report on Patentability—PCT/US2021/038770 The International Bureau of WIPO—Geneva, Switzerland, Jan. 5, 2023.
International Search Report and Written Opinion—PCT/US2021/038770—ISA/EPO—Oct. 11, 2021.
Nokia, et al., "Remaining Issues on NR-U HARQ Scheduling and Feedback," 3GPP Draft, 3GPP TSG RAN WG1 Meeting #100b, R1-2002227, 3rd Generation Partnership Project (3GPP), Mobile Competence Centre, 650, Route Des Lucioles, F-06921, Sophia-Antipolis Cedex, France, vol. RAN WG1, No. Online Meeting, Apr. 20, 2020-Apr. 30, 2020, Apr. 10, 2020 (Apr. 10, 2020), XP051873488, 15 pages, section 2.4, sections 3.5-3.6.
European Search Report—EP24200102—Search Authority—The Hague—Sep. 30, 2024.

* cited by examiner

2044

Priority-based physical channel processing circuitry

Circuitry for canceling one of two physical UL channels when the two UL channels overlap in time based on a respective priority of the two physical UL channels
2102

Circuitry for multiplexing two physical UL channels when the two UL channels overlap in time and are of equal priority
2104

Circuitry for assigning a priority to a physical UL channel irrespective of DCI priority indicators 2106

Circuitry for assigning a priority to a physical UL channel based on DCI priority indicators
2108

Circuitry for assigning a priority to a physical UL channel based on a second or additional DCI with a priority indicator
2110

Circuitry for applying one-shot HARQ-ACK feedback for use with RRC
2112

Circuitry for applying one-shot HARQ-ACK feedback for use with a particular component carrier (CC)
2114

FIG. 21

MANAGEMENT OF SINGLE-SHOT HARQ-ACK CODEBOOKS ALONG WITH HARQ-ACK CODEBOOKS WITH SET PRIORITY LEVELS

CROSS-REFERENCE TO RELATED APPLICATIONS

This Patent Application is a Continuation of U.S. patent application Ser. No. 17/355,070, filed Jun. 22, 2021 which claims priority to Provisional Application No. 63/043,725, filed Jun. 24, 2020, and assigned to the assignee hereof and hereby expressly incorporated by reference herein as if fully set forth below and for all applicable purposes.

FIELD OF THE DISCLOSURE

The technology discussed herein generally relates to wireless communication systems, and more particularly, to wireless communication using hybrid automatic repeat request (HARQ)-acknowledgment (ACK) feedback processing.

DESCRIPTION OF RELATED ART

As the demand for higher data rates and improved reliability increases, wireless network operators continue to develop mechanisms to maximize throughput and minimize the delay. One such mechanism is the Hybrid Automatic Repeat Request (HARQ) process, which may combine both Forward Error Correction (FEC) and Automatic Repeat Request (ARQ) to correct errors in received packets. FEC adds redundancy (parity bits) to the transmitted data to enable a certain amount of erroneously received bits to be corrected at the receiver. If a packet arrives having a higher number of errors than can be corrected using FEC, the ARQ process is initiated to request a retransmission of the packet from the sender.

In general, HARQ uses a stop and wait (SAW) protocol, in which a transmitting entity waits to receive an acknowledged (ACK) or not acknowledged (NACK) back from the receiving entity before transmitting another packet or retransmitting the same packet. Each HARQ process is identified by a unique HARQ process identifier (ID).

SUMMARY

The following presents a summary of one or more aspects of the present disclosure, in order to provide a basic understanding of such aspects. This summary is not an extensive overview of all contemplated features of the disclosure, and is not intended to either identify key or critical elements of any or all aspects of the disclosure or delineate the scope of any or all aspects of the disclosure. Its purpose is to present some concepts of one or more aspects of the disclosure in a form as a prelude to the more detailed description that is presented later.

In one example, a wireless communication device is provided. The wireless communication device includes: a transceiver; a memory; and a processor communicatively coupled to the transceiver and the memory. The processor and the memory are configured to: process a plurality of hybrid automatic repeat request (HARQ)-acknowledgment (ACK) codebooks, wherein the HARQ-ACK codebooks comprise priority-based HARQ-ACK codebooks of differing priorities and a separate one-shot HARQ-ACK codebook; and process first and second physical uplink channels based at least in part on a priority of the first uplink channel and a priority of the second uplink channel, wherein one of the first and second physical uplink channels contains the one-shot HARQ-ACK codebook, and wherein the processing is performed in combination with the use of priority-based HARQ-ACK codebooks.

In another example, a method is provided for wireless communication for use by a wireless device in a communications network. The method includes: obtaining a plurality of HARQ-ACK codebooks, wherein the plurality of HARQ-ACK codebooks comprise priority-based HARQ-ACK codebooks of differing priorities and a separate one-shot HARQ-ACK codebook; and processing first and second physical uplink channels based at least in part on a priority of the first physical uplink channel and a priority of the second physical uplink channel, wherein one of the first and second physical uplink channels includes the one-shot HARQ-ACK codebook, and wherein the processing is performed in combination with the use of the priority-based HARQ-ACK codebooks In another example, an apparatus is provided for use in a wireless communication device of a wireless communications network. The apparatus includes: means for configuring a plurality of HARQ-ACK codebooks, wherein the HARQ-ACK codebooks comprise priority-based HARQ-ACK codebooks of differing priorities and a separate one-shot HARQ-ACK codebook; and means for processing first and second physical uplink channels based at least in part on a priority of the first uplink channel and a priority of the second uplink channel, wherein one of the first and second physical uplink channels contains the one-shot HARQ-ACK codebook, and wherein the processing is performed in combination with the use of priority-based HARQ-ACK codebooks.

In another example, an article of manufacture is provided for use by a wireless communication device of a wireless communications network. The article includes a computer-readable medium having stored therein instructions executable by one or more processors of the wireless communication device to: configuring a plurality of HARQ-ACK codebooks, wherein the HARQ-ACK codebooks comprise priority-based HARQ-ACK codebooks of differing priorities and a separate one-shot HARQ-ACK codebook; and process first and second physical uplink channels based at least in part on a priority of the first uplink channel and a priority of the second uplink channel, wherein one of the first and second physical uplink channels contains the one-shot HARQ-ACK codebook, and wherein the processing is performed in combination with the use of priority-based HARQ-ACK codebooks.

BRIEF DESCRIPTION OF THE DRAWINGS

FIG. 21 is a block diagram illustrating exemplary components of a processor of a UE according to some aspects.

DETAILED DESCRIPTION

Figure 1:
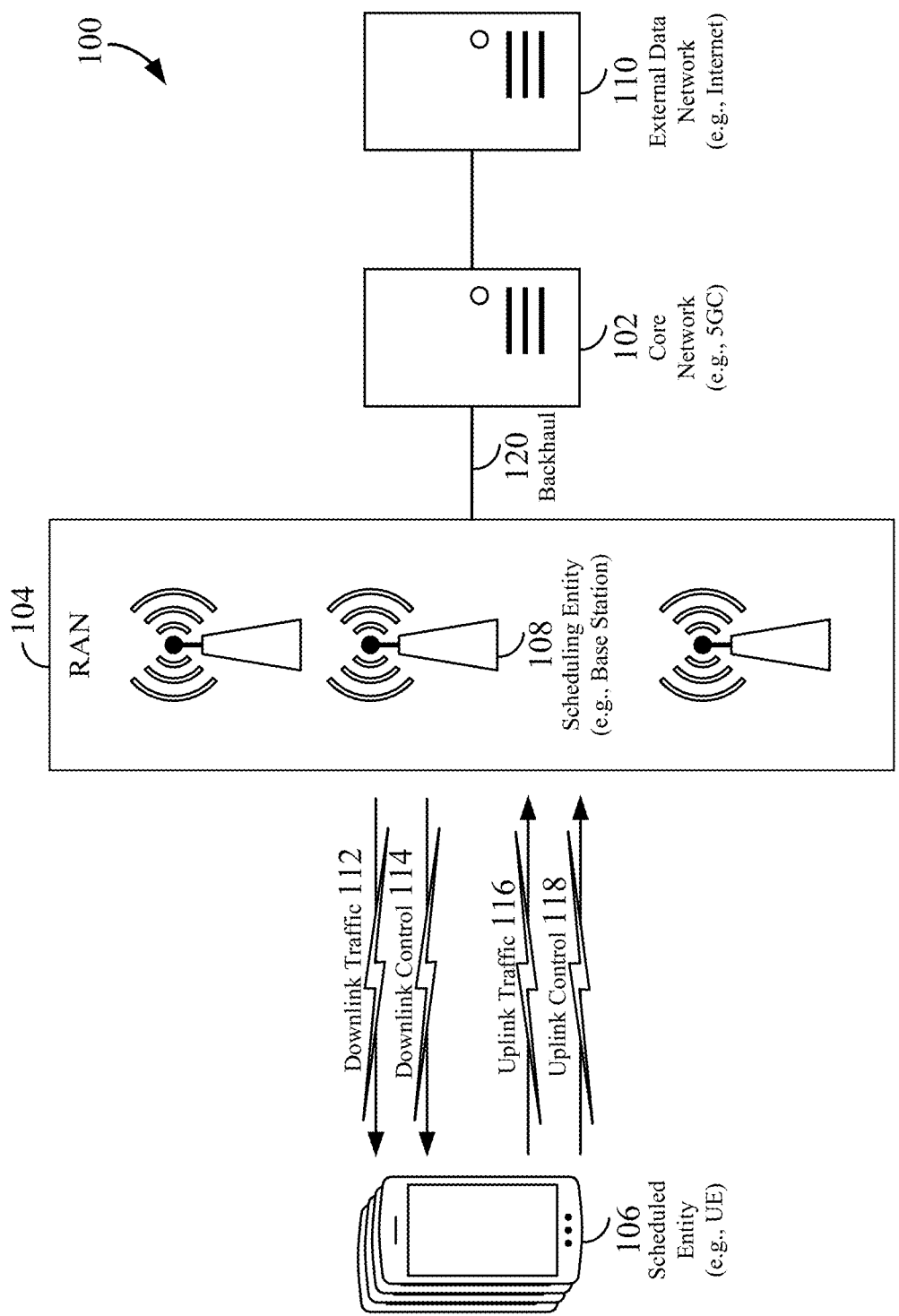
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure provide for managing the use and coexistence of multiple Hybrid Automatic Repeat Request (HARQ)-Acknowledgment (ACK) codebooks of differing priorities (e.g., Type 1 or Type 2 codebooks) along with Type 3 (single-shot) HARQ-ACK codebooks within wireless communication standards such as 3rd Generation Partnership Project (3GPP) New Radio (NR) specifications (often referred to as 5G). For example, a wireless communication device (e.g., a user equipment (UE)) may be configured to configure a plurality of HARQ-ACK codebooks. The HARQ-ACK codebooks can include priority-based HARQ-ACK codebooks of differing priorities and one-shot HARQ-ACK codebooks. The UE may further be configured to process first and second physical uplink channels while prioritizing the use of the one-shot HARQ-ACK codebooks in combination with the use of priority-based HARQ-ACK codebooks of differing priorities. Illustrative examples are described herein where these procedures are performed by a UE (or other scheduled entity) that is in communication with a base station (such as a gNB or other scheduling entity). Operations of base stations are also discussed and described and block diagram illustrations of exemplary base stations (or other scheduling entities) are provided.

Before discussing these and other techniques in detail, an overview of a wireless communication system employing HARQ-ACK feedback is provided. However, it is noted that the various concepts presented throughout this disclosure may be implemented across a broad variety of telecommunication systems, network architectures, and communication standards.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106 (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities 106 (e.g., one or more UEs 106) to the scheduling entity 108. On the other hand, the scheduled entity 106 (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
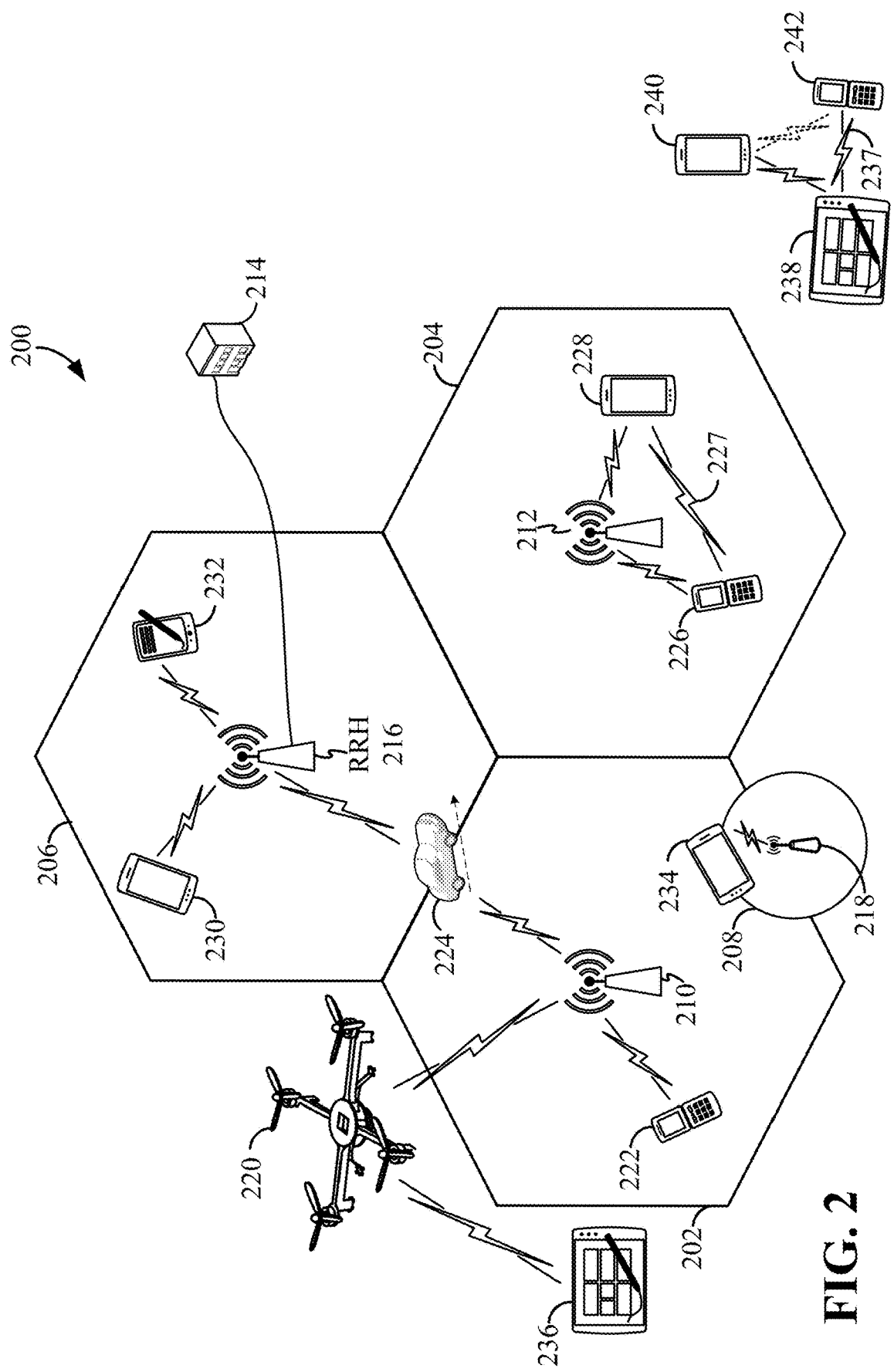
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the RAN are generally set up, maintained, and released under the control of an access and mobility management function (AMF, not illustrated, part of the core network 102 in FIG. 1). In some scenarios, the AMF may include a security context management function (SCMF) and a security anchor function (SEAF) that performs authentication. The SCMF can manage, in whole or in part, the security context for both the control plane and the user plane functionality.

In some examples, the RAN 200 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of the parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into encoded code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks and/or high code rates, while the other base graph is used otherwise. Control information and the physical broadcast channel (PBCH) are coded using polar coding, based on nested sequences. For at least some of the channels, puncturing, shortening, and repetition are used for rate-matching.

However, those of ordinary skill in the art will understand that aspects of the present disclosure may be implemented utilizing any suitable channel code. Various implementations of scheduling entities and scheduled entities may include suitable hardware and capabilities (e.g., an encoder, a decoder, and/or a CODEC) to utilize one or more of the channel codes for wireless communication.

However, even with the best error correcting codes, if the communication channel experiences a very large amount of noise, or experiences a deep fade or other issue, the bit error rate may exceed what can be compensated. Accordingly, many wireless communication networks utilize a hybrid automatic repeat request (HARQ) scheme to further improve data reliability. In a HARQ algorithm, the transmitting device (e.g., a base station or UE) may retransmit code blocks (e.g., encoded using convolutional or block codes) if the first transmission is not decoded correctly at the receiving device. To facilitate this process, a transmitted encoded code block may include a cyclic redundancy check (CRC) portion, a checksum, or any other suitable mechanism known to those of ordinary skill in the art to determine whether the encoded code block is decoded properly at the receiving device. If the received encoded code block is properly decoded, then the receiving device may transmit an acknowledged (ACK), informing the transmitting device that a retransmission is not needed. However, if the received encoded code block is not properly decoded, then the receiving device may transmit a not acknowledged (NACK) requesting a retransmission. In general, a limited number of retransmissions will be made before the transmission attempt is terminated. Many existing networks limit their HARQ algorithms to four retransmissions. However, any suitable retransmission limit may be utilized in a network within the scope of the present disclosure.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
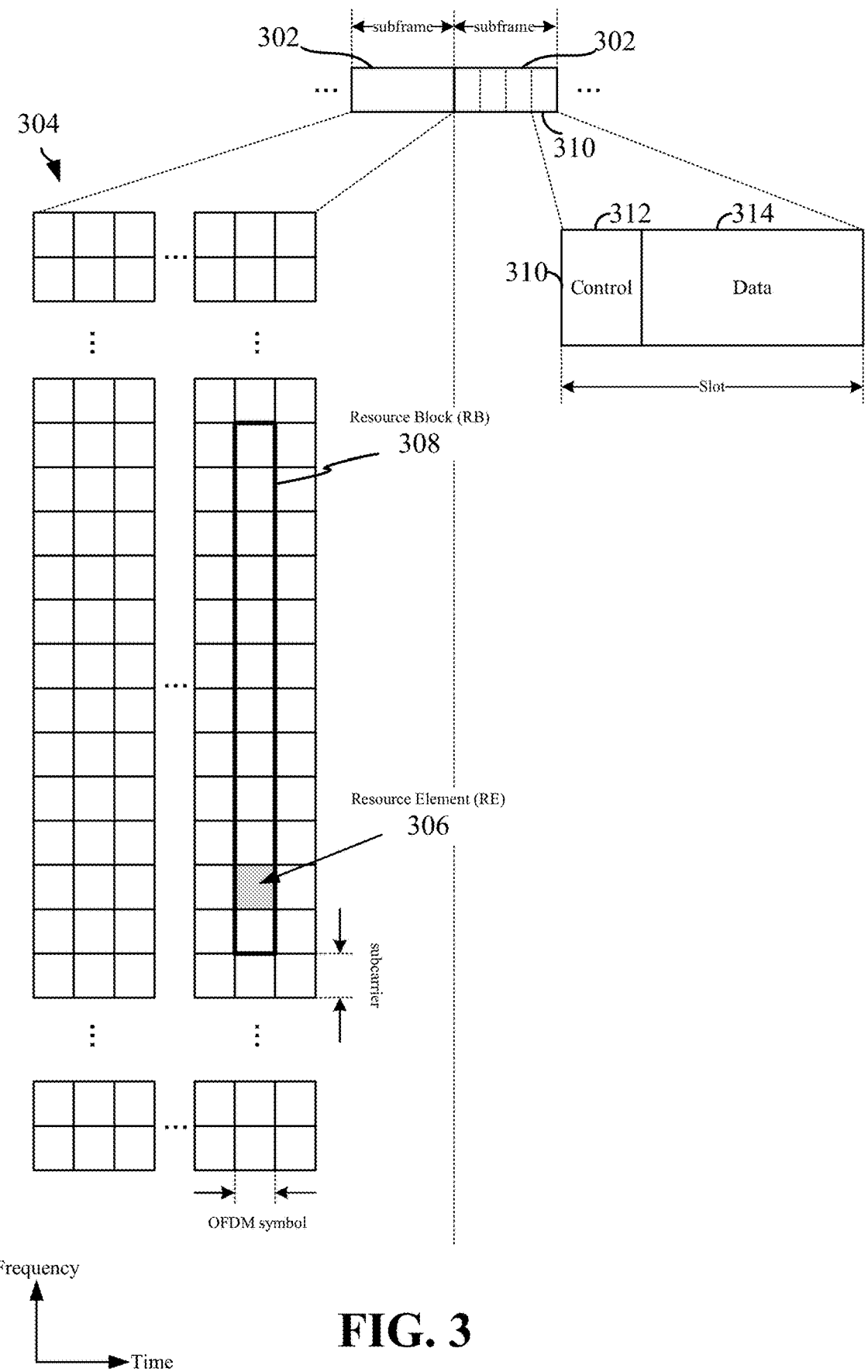
FIG. 3 is a diagram illustrating an example of a frame structure for use in a radio access network according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). The mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Turning now to HARQ-ACK feedback, within at least some wireless communication standards, such as Release 16 of 3GPP NR, a UE can be configured with multiple (up to two) priority-based HARQ-ACK codebooks that have an associated priority. The term priority-based is used herein to distinguish these codebooks from the one-shot codebooks discussed in detail below that contain HARQ-ACK feedback for all HARQ processes irrespective of the priority and hence may not be priority-based directly. Each codebook includes information bits for encoding or representing a particular HARQ acknowledgement, e.g., the codebook is a particular sequence of bits. The UE can be configured with up to two HARQ-ACK codebooks through a radio resource control (RRC) parameter: pdsch-HARQ-ACK-CodebookList. References herein to parameters such as pdsch-HARQ-ACK-CodebookList, refer to parameters defined within 3GPP TS 38.213, Release 16, and related documents. The codebook type can be the same or different for the configured HARQ-ACK codebooks, e.g., one can be Type 1 (semi-static) while the other is Type 2 (dynamic), or both can be Type 2, etc.

A priority indicator field in DCI (DL DCI formats 1_1 or 1_2) indicates which codebook should be used for reporting the HARQ-ACK corresponding to the PDSCH scheduled by the DCI. If priority is not provided (e.g., a priority field is not configured for the DCI or the DCI format 10 is used), the system assumes priority 0 (lower priority). For a HARQ-ACK corresponding to semi-persistent scheduling (SPS), priority is RRC configured as part of SPS configurations. PUCCH resources for HARQ-ACK codebooks are configured separately where a PUCCH resource indicator (PRI) field in the DCI with a given priority indicates a PUCCH resource among the corresponding PUCCH resources. Further information regarding physical layer procedures for control may be found in 3GPP TS 38.213, Release 16, Physical layer Procedures for Control.

Figure 4:
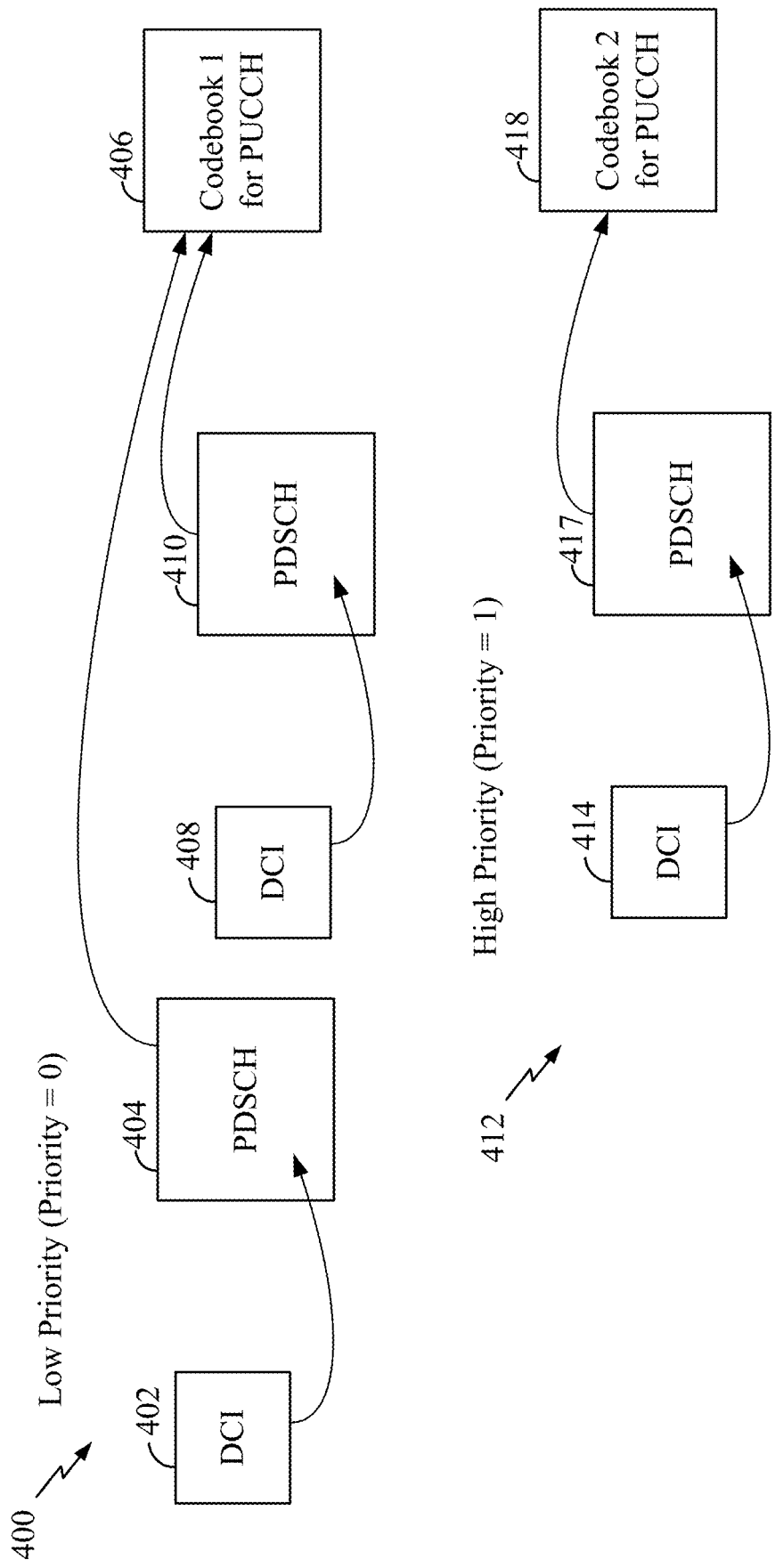
FIG. 4 is a diagram illustrating low and high priority codebook processing examples according to some aspects.

FIG. 4 illustrates at a high level the separate processing of low priority and high priority codebooks according to some aspects. Briefly, for a low priority example 400 (e.g., priority=0), a first DCI 402 schedules a PDSCH 404, which is associated with a first HARQ-ACK codebook 406 of a PUCCH. In the low priority example 400, a second DCI 408 schedules a PDSCH 410, which is also associated with the first HARQ-ACK codebook 406. For a high priority example 412 (e.g., priority=1), a third DCI 414 schedules a PDSCH 416, which is associated with a second different HARQ-ACK codebook 418 of a PUCCH.

Insofar as cancelation of overlapping physical channels is concerned, within Release 16, if two different UL channels with different priorities overlap in time, the low priority channel is canceled and the high priority channel is transmitted. If the channels have the same priority, the UE multiplexes PUCCH with another PUCCH or multiplexes PUCCH with PUSCH. If the channels have different priorities, the low priority channel is canceled. Note that the high priority UL channel can be PUCCH with HARQ-ACK or PUCCH with SR or PUSCH (dynamic or configured grant). The low priority channel can be PUCCH with HARQ-ACK, PUCCH with SR, PUCCH with CSI, or PUSCH (with a dynamic or configured grant). Insofar as the priority indication is concerned, for PUCCH with HARQ-ACK, priority may be designated as described above via DCI. For PUCCH with SR, priority is designated in the RRC configuration. For PUCCH with CSI, low priority is designated (e.g., there is no high priority in that particular case). For dynamic PUSCH, the priority is given in DCI scheduling PUSCH (DCI format 0_1, 0_2). For a configured grant PUSCH, the priority is given in RRC as part of CG configuration.

Figure 5:
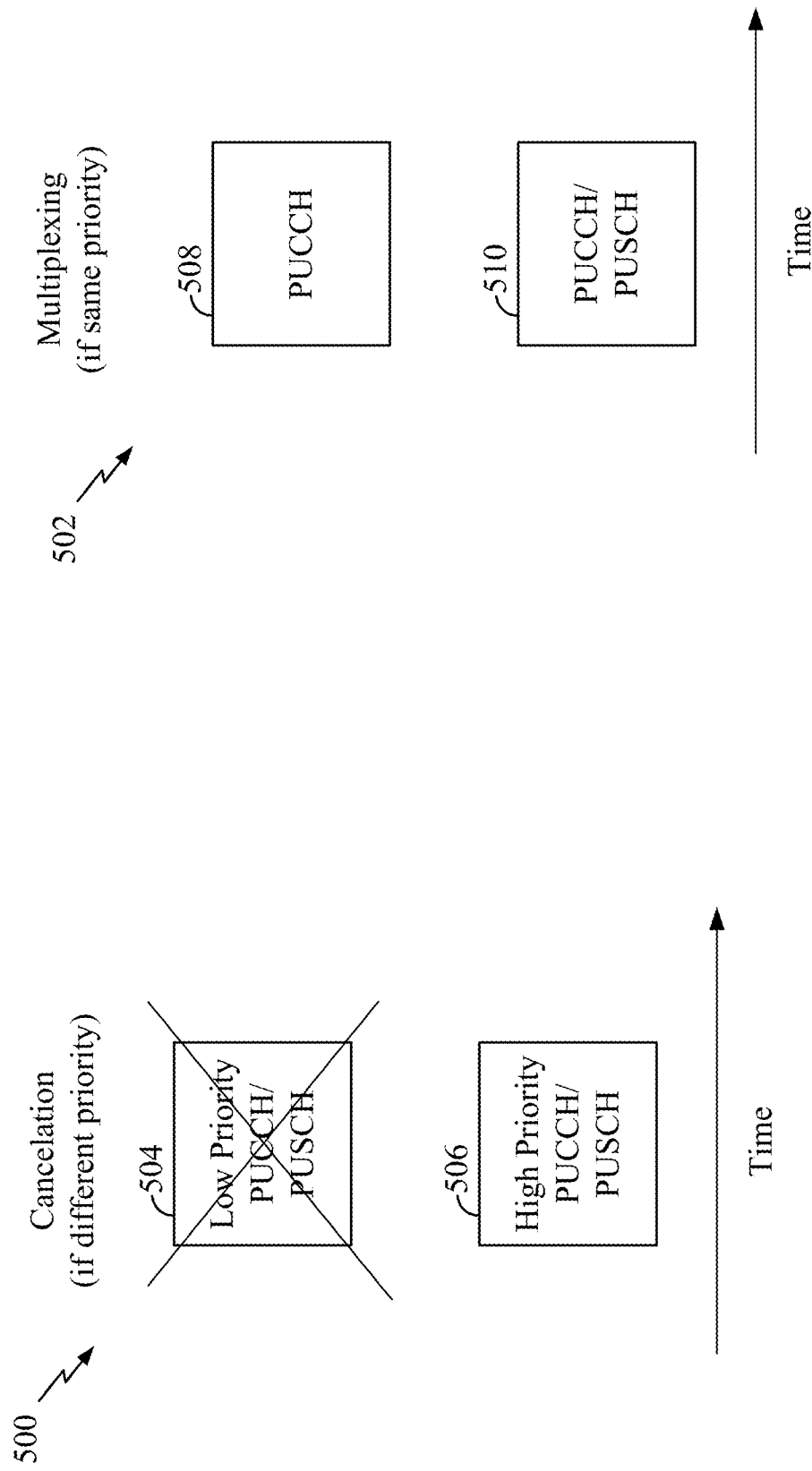
FIG. 5 is a diagram illustrating examples of canceling or multiplexing overlapping channels according to some aspects.

FIG. 5 illustrates examples of canceling 500 or multiplexing 502 overlapping channels according to some aspects. In the cancelation case 500, a low priority PUCCH/PUSCH 504 is canceled if it overlaps in time with a high priority PUCCH/PUSCH 506. In the multiplexing case 502, a PUCCH 508 is time multiplexed with a PUCCH/PUSCH 510, if the PUCCH 508 and the PUCCH/PUSCH 510 overlap in time and have the same priority.

Turning now to the "one-shot" (or Type 3) codebooks of Release 16, the one-shot HARQ-ACK feedback allows a gNB to request feedback of a HARQ-ACK codebook for all configured DL HARQ processes for all configured component carriers (CCs) configured for a UE. One-shot feedback can be configurable with semi-static codebook, non-enhanced dynamic HARQ codebook, and enhanced dynamic codebook. Herein, non-enhanced dynamic codebooks and enhanced dynamic codebook are both generally referred to as dynamic codebooks. The codebook is configured in RRC, if the UE is provided with pdsch-HARQ-ACK-OneShot-Feedback. If the UE is triggered to report both one-shot and other semi-static or dynamic HARQ-ACK feedback in the same slot, the UE reports only the one-shot feedback under Release 16. Essentially, the one-shot feedback "replaces" whatever is originally requested to be reported. The request is carried in DCI 1_1. That is, the one bit ("One-shot HARQ-ACK request" field) in DCI 1_1 is set when the UE is provided with pdsch-HARQ-ACK-OneShotFeedback. The UE determines the PUCCH for one-shot HARQ-ACK feedback from K1, PUCCH resource indicator (PRI), and transmit power control (TPC), where K1 is an offset between a DL slot where the data is scheduled on PDSCH and the UL slot where the ACK/NACK feedback for the scheduled PDSCH data needs to be sent. In accordance with the procedures of Release 15 3GPP NR specifications, the feedback can be piggybacked on PUSCH. Note that the DL DCI can either schedule or not schedule a PDSCH. For example, one value of the frequency domain resource assignment field indicates that the DCI does not schedule a PDSCH. Otherwise, the DCI schedules a PDSCH and at the same time requests one-shot feedback for all HARQ processes.

Under Release 16, a new data indicator (NDI) can be configured to be part of one-shot HARQ feedback. An NDI is transmitted within DCI and utilized to indicate a first transmission of a transport block. When NDI is configured, the latest NDI value detected by the UE is reported along with HARQ-ACK for the corresponding HARQ process ID. The UE assumes NDI=0 if there is no prior NDI value for the HARQ process. When NDI is not configured, the NDI value is not reported along with HARQ-ACK for the corresponding PDSCH. The UE is expected to reset the HARQ-ACK state (as discontinuous transmission (DTX) or NACK) for a HARQ process ID once feedback is reported for the same HARQ process ID in the previous feedback. For higher HARQ efficiency, when a transport block (TB) contains multiple code blocks, the code blocks may be grouped into code block groups (CBGs). CBG-based HARQ-ACK or TB-based HARQ-ACK can be configured to be part of the one-shot HARQ feedback for the CCs configured with CBG.

In the following, various techniques are described that allow for combining the features of (a) priority-based HARQ-ACK codebooks corresponding to two different priorities (e.g., a UL channel with lower priority may be canceled in case of collision or UL channels are multiplexed if of equal priority) and (b) one-shot (type 3) HARQ-ACK codebooks. As noted above, the one-shot codebook contains HARQ-ACK for all HARQ processes and priority is not ordinarily distinguished. The following techniques also provide for setting the priorities for physical UL channels, such as PUCCHs, and for selectively canceling an overlapping channel (e.g., in circumstances where one channel has higher priority) or selectively multiplexing overlapping channels (e.g., in circumstances where channels have equal priority).

Figure 6:
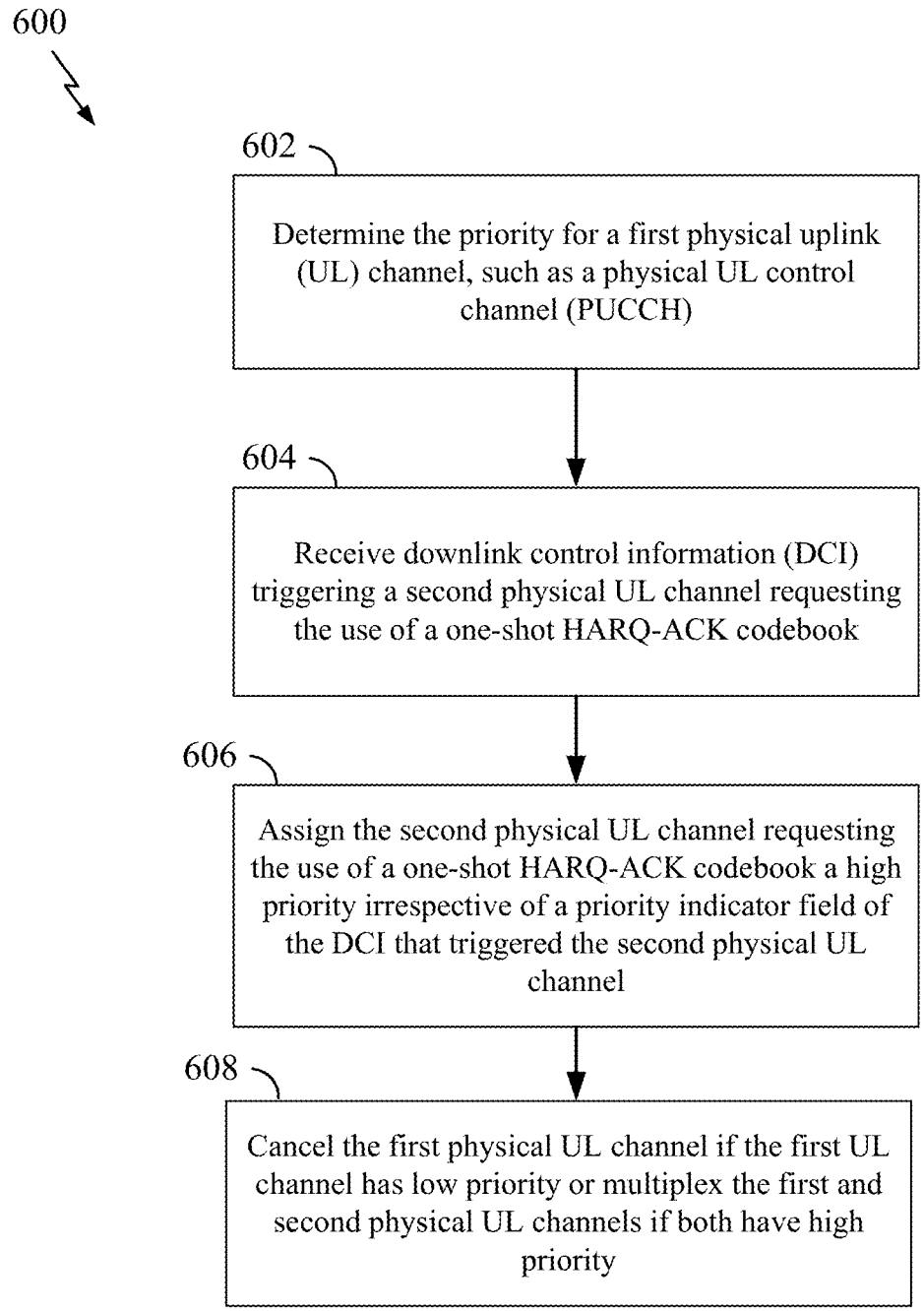
FIG. 6 is a flow chart illustrating a wireless communication method for use by a wireless communication device to assign a priority to a physical uplink (UL) channel in accordance with some aspects.

FIG. 6 is a flow chart illustrating an exemplary process 600 that may be performed by a UE or other scheduled entity to assign a priority to a physical uplink (UL) channel in accordance with some aspects. Briefly, in this example, the priority of a physical UL channel with one-shot HARQ-ACK feedback is fixed to high priority irrespective of the DCI/priority indicator field in the DCI that triggered the physical UL channel with the one-shot feedback. High priority is used, at least in part, because one-shot feedback is a fallback mechanism. Thus, when one-shot feedback is requested, the one-shot feedback should be reported. At block 602, the UE determines the priority for a first physical UL channel, such as a PUCCH. At block 604, the UE receives DCI that triggers a second physical UL channel that requests the use of a one-shot HARQ-ACK codebook. At block 606, the UE assigns the second physical UL channel requesting the use of a one-shot HARQ-ACK codebook a high priority irrespective of a priority indicator field of the DCI that triggered the second physical UL channel. At block 608, the UE cancels the first UL channel if the first physical UL channel has a low priority (since the second physical UL channel has high priority) or multiplexes the first and second UL channels if both have high priority.

Figure 7:
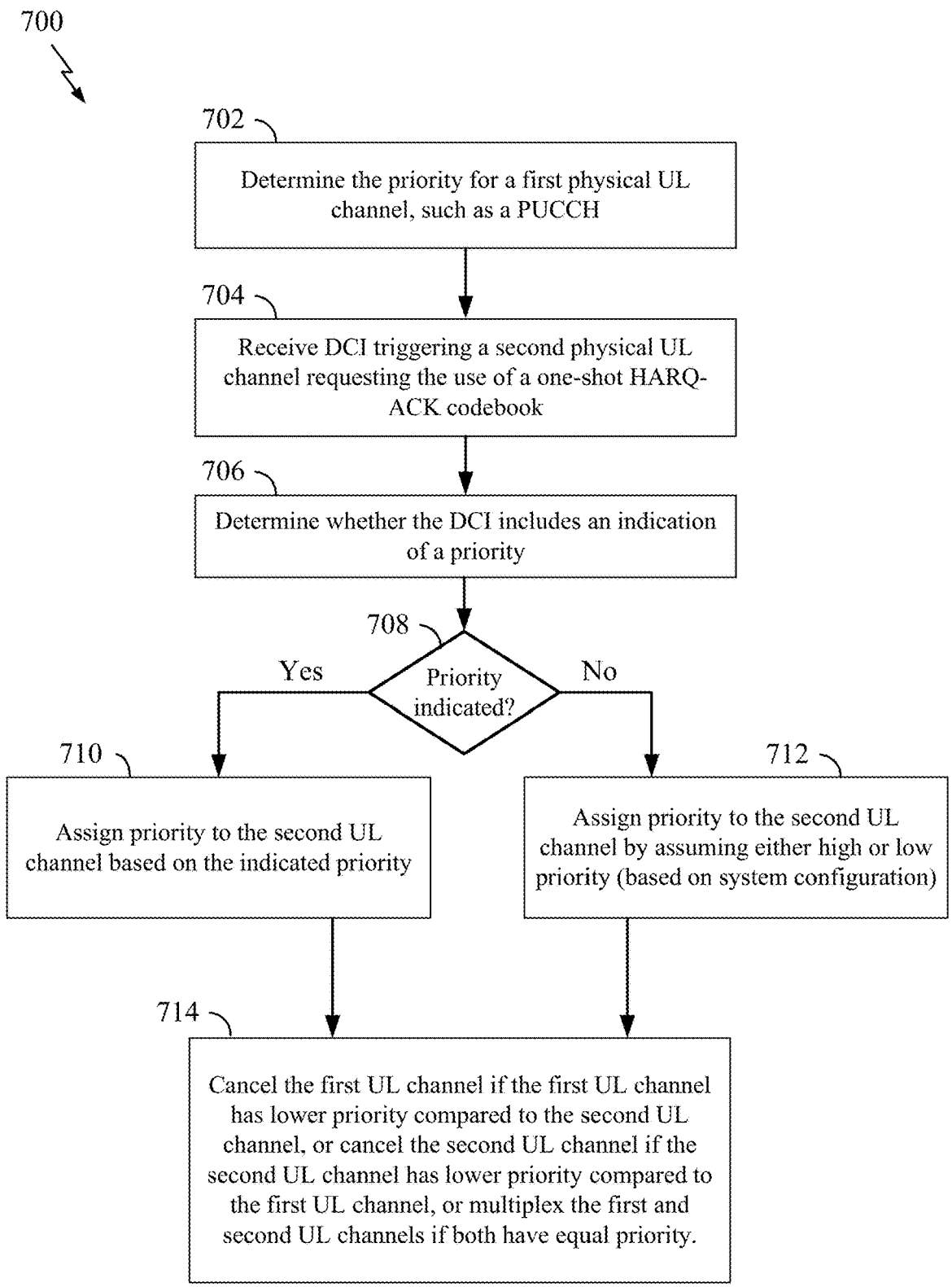
FIG. 7 is a flow chart illustrating another wireless communication method for use by a wireless communication device to assign a priority to a physical UL channel in accordance with some aspects.

FIG. 7 is a flow chart illustrating an exemplary process 700 that may be performed by a UE or other scheduled entity to assign a priority to a physical UL channel in accordance with some aspects. In this example, if the DCI that requested a one-shot feedback includes a priority indicator field, the priority is set by the field. Otherwise, the priority is assumed to be high (or in other examples, it is assumed to be low, depending on the configuration of the overall system). As with the procedure of FIG. 6, the UE determines the priority for a first physical UL channel (block 702). The UE then receives DCI that triggers a second physical UL channel (block 704) that requests the use of a one-shot HARQ-ACK feedback codebook. At block 706, the UE determines whether the DCI includes an indication of a priority. If priority is indicated in the DCI, then following decision block 708, the UE at block 710 assigns the priority to the second physical UL channel based on the indicated priority. For example, if the indicated priority is high, then high priority is assigned to the second physical UL channel. If the indicated priority is low, then low priority is assigned to the second physical UL channel. On the other hand, if priority is not indicated in the DCI that triggered the second physical UL channel, processing instead proceeds to block 712 where the UE assigns the priority to the second physical UL channel by assuming either high or low priority (e.g., based on a predetermined system configuration). For example, if the overall standard (which specifies the operation of the UE and the other components in the wireless communication system) indicates that high priority should be assumed in this scenario, then the second physical UL channel is assigned high priority. Conversely, if the overall standard (e.g., 3GPP New Radio standard or specification) indicates that low priority should be assumed in this scenario, then the second physical UL channel is assigned low priority.

Thereafter, at block 714, the UE cancels the first UL channel if the first UL channel has a lower priority compared to the second UL channel, or cancels the second UL channel if the second UL channel has a lower priority compared to the first UL channel, or multiplexes the first and second UL channels if both have equal priority (e.g., both are high or both are low).

Figure 8:
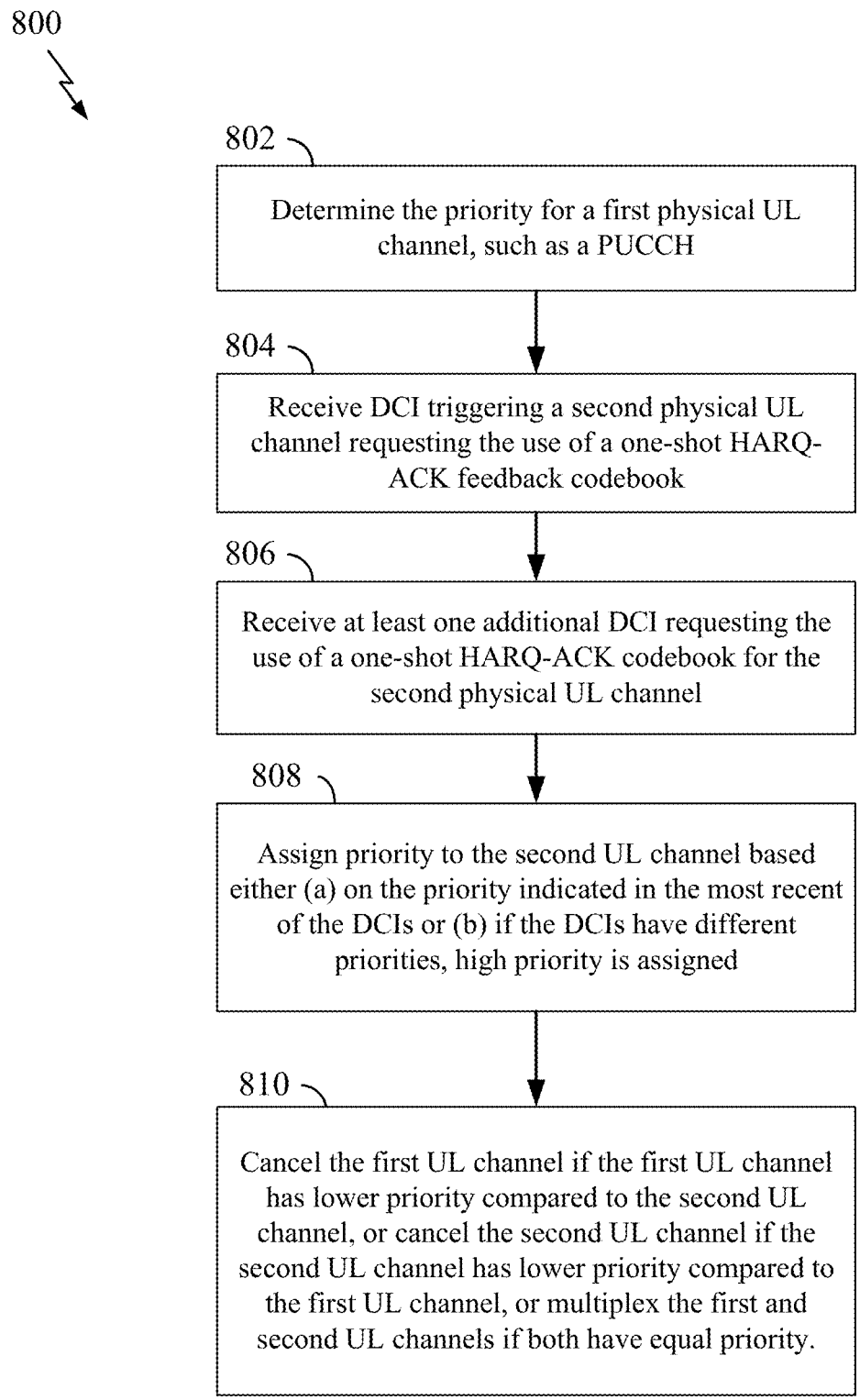
FIG. 8 is a flow chart illustrating another wireless communication method for use by a wireless communication device to assign a priority to a physical UL channel in accordance with some aspects.

FIG. 8 is a flow chart illustrating an exemplary process 800 that may be performed by a UE or other scheduled entity to assign a priority to a physical UL channel in accordance with some aspects. In this example, two or more (multiple) DCIs indicate the same physical UL channel and request one-shot HARQ-ACK feedback. The multiple DCIs also include priority indicators. In one particular example, the priority indicator field of the most recent DCI is used regardless of whether the earlier DCIs indicate the same priority or a different priority. In another example, if the multiple DCIs indicate different priorities (e.g., at least one indicates low priority while at least one indicates high priority), high priority is assumed. As with the procedures of FIGS. 6 and 7, the UE determines the priority for a first physical UL channel (block 802). The UE then receives DCI that triggers a second physical UL channel (block 804) that requests the use of a one-shot HARQ-ACK feedback codebook.

At block 806, the UE receives at least one additional DCI (e.g., a second DCI) requesting the use of a one-shot HARQ-ACK codebook for the second physical UL channel. At block 808, the UE assigns priority to the second UL channel either (a) based on the priority indicated in the most recent of the DCIs, or (b) as a high priority if the DCIs have different priorities. As an example of (a), if the most recent DCI requesting one-shot HARQ-ACK feedback for the second physical UL channel indicates low priority, then low priority is assigned, regardless of the priority of the DCI received at block 804. Conversely, if the most recent DCI indicates high priority, then high priority is assigned, again regardless of the priority of the DCI received at block 804. As an example of (b), if the most recent DCI requesting one-shot HARQ-ACK feedback for the second physical UL channel indicates low priority but the DCI received at block 804 indicates high priority, then high priority is assigned. In accordance with the example of (b), so long as at least one DCI has high priority, high priority is assigned. Low priority is assigned in the example only if all of the DCIs requesting one-shot HARQ-ACK feedback for the second physical UL channel indicate low priority.

Thereafter, at block 810, the UE cancels the first UL channel if the first UL channel has a lower priority compared to the second UL channel, or cancels the second UL channel if the second UL channel has a lower priority compared to the first UL channel, or multiplexes the first and second UL channels if both have equal priority (e.g., both are high or both are low). Whether option (a) or option (b) is used depends, e.g., on the applicable wireless communication standard that specifies the operation of the UE and the other components in the wireless communication system.

Figure 9:
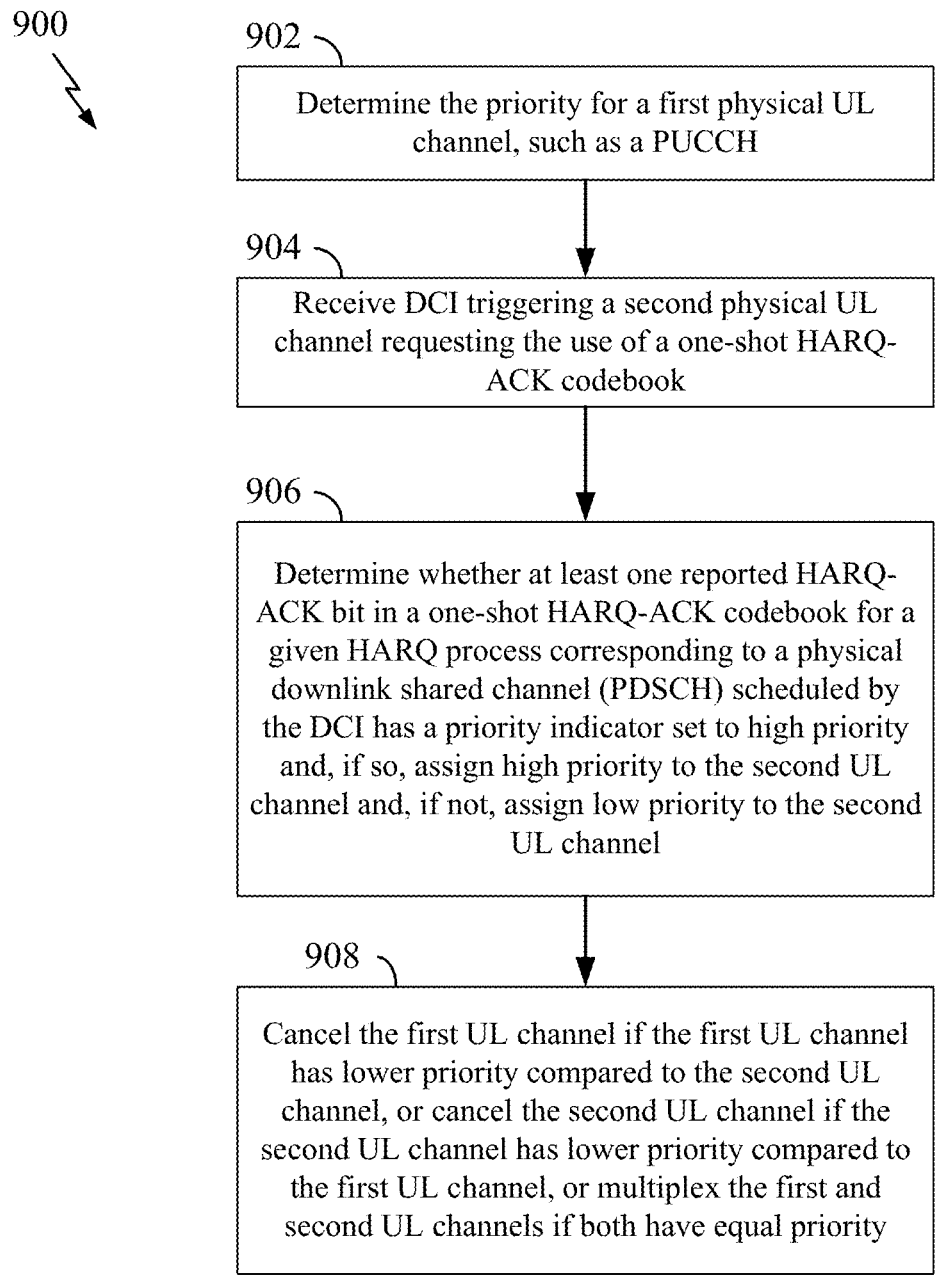
FIG. 9 is a flow chart illustrating a wireless communication method for use by a wireless communication device to assign a priority to a physical UL channel in accordance with some aspects.

FIG. 9 is a flow chart illustrating an exemplary process 900 that may be performed by a UE or other scheduled entity to assign a priority to a physical UL channel in accordance with some aspects. In this example, if at least one reported HARQ-ACK bit for a given HARQ process corresponding to a PDSCH that is scheduled by a DCI has a priority indicator field set to 1 (high priority), then the second physical UL channel (e.g., a PUCCH triggered by a DCI requesting the use of a one-shot HARQ-ACK feedback codebook) is assigned high priority. Otherwise, if all PDSCHs for which HARQ-ACK is being reported in the PUCCH are scheduled by DCIs with priority indicator fields set to 0, the PUCCH is assigned low priority.

As with the above-described procedures, the UE determines the priority for a first physical UL channel (block 902). The UE then receives DCI that triggers a second physical UL channel (block 904) that requests the use of a one-shot HARQ-ACK feedback codebook. At block 906, the UE determines whether at least one reported HARQ-ACK bit in the one-shot HARQ-ACK codebook for a given HARQ process corresponding to a PDSCH that is scheduled by the DCI has a priority indicator set to high priority. If so, high priority is assigned to the second physical UL channel and, if not, low priority is assigned to the second physical UL channel. Thereafter, at block 908, the UE cancels the first UL channel if the first UL channel has a lower priority compared to the second UL channel, cancels the second UL channel if the second UL channel has a lower priority compared to the first UL channel, or multiplexes the first and second UL channels if both have equal priority (e.g., both are high or both are low), as already discussed.

Figure 10:
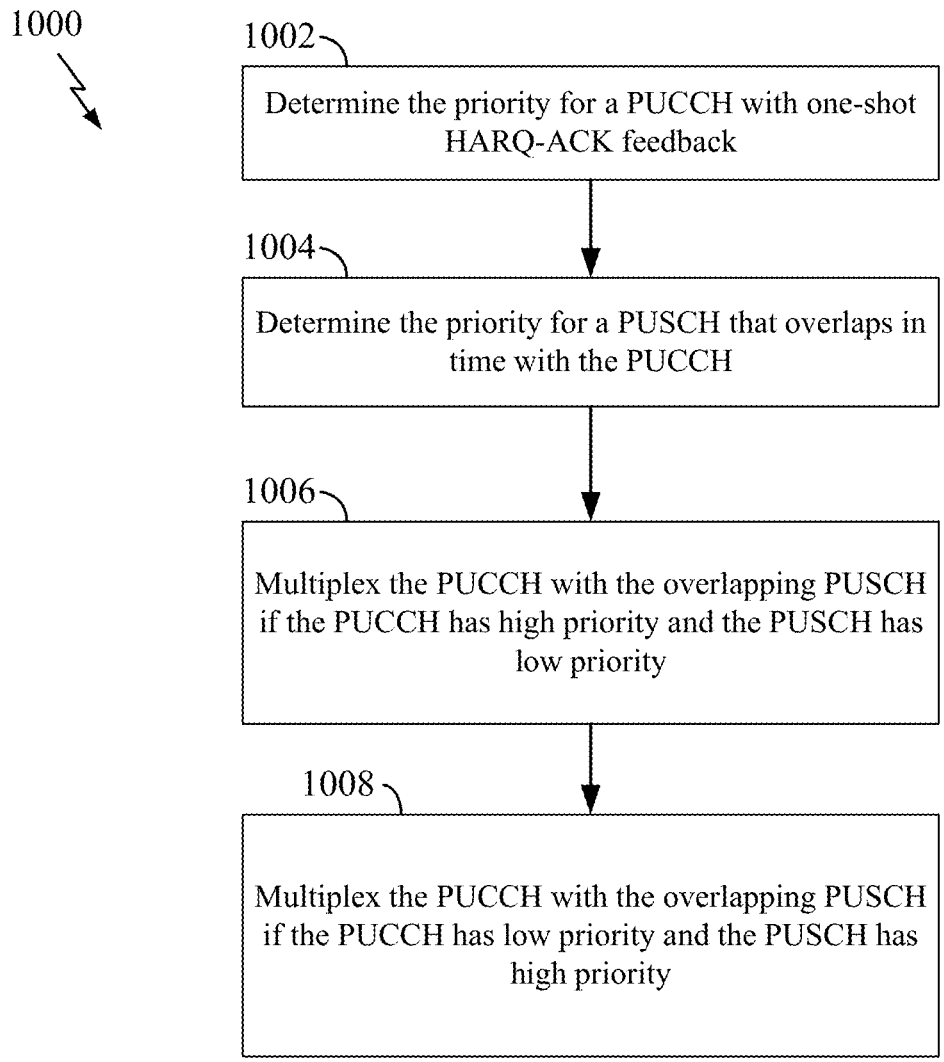
FIG. 10 is a flow chart illustrating a wireless communication method for use by a wireless communication device to multiplex physical UL channels in accordance with some aspects.

FIG. 10 is a flow chart illustrating an exemplary process 1000 that may be performed by a UE or other scheduled entity to multiplex physical UL channels in accordance with some aspects. In this example, if a PUCCH with one-shot feedback has high priority, the PUCCH is multiplexed with a low priority PUSCH (assuming a time overlap). That is, rather than canceling the low priority PUSCH, the low priority PUSCH is multiplexed with the higher priority PUCCH. This may be particularly useful since the payload of a one-shot HARQ-ACK can be large and the PUSCH may have more available resources. If a PUCCH with one-shot feedback has low priority, the PUCCH can be multiplexed with a high priority PUSCH (assuming a time overlap). That is, rather than canceling the low priority PUCCH, the low priority PUCCH is multiplexed with the higher priority PUSCH. This may be useful since one-shot feedback includes HARQ-ACK for all HARQ processes, some of which may be associated with a high priority Ultra Reliable Low Latency Communication (URLLC).

Beginning at block 1002 of FIG. 10, the UE determines the priority for a PUCCH with one-shot HARQ-ACK feedback. At block 1004, the UE determines the priority for a PUSCH that overlaps in time with the PUCCH. At block 1006, the UE multiplexes the PUCCH with the overlapping PUSCH if the PUCCH has high priority and the PUSCH has low priority. At block 1008, the UE multiplexes the PUCCH with the overlapping PUSCH if the PUCCH has low priority and the PUSCH has high priority. Additionally, although not shown in FIG. 10, if the PUCCH and the PUSCH are of equal priority, the PUCCH and the PUSCH can be multiplexed as well. (FIG. 10 focusses on the scenarios where UL channels of unequal priority are multiplexed.)

Figure 11:
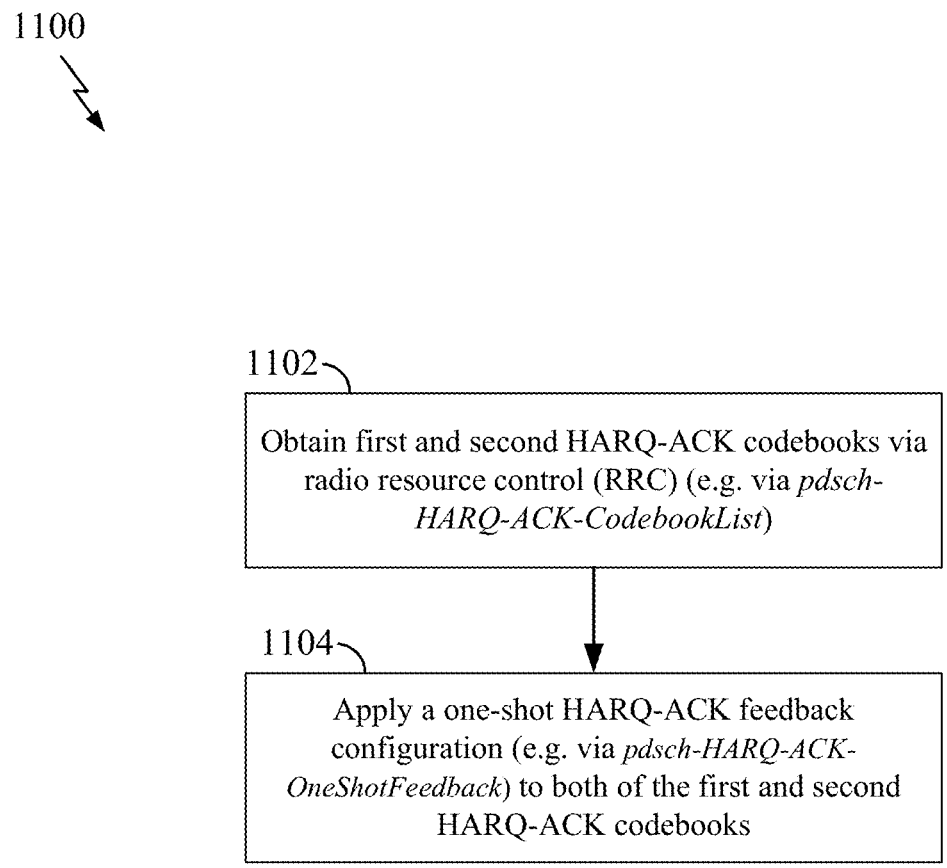
FIG. 11 is a flow chart illustrating a wireless communication method for use by a wireless communication device to apply a one-shot HARQ-ACK feedback configuration to two HARQ-ACK codebooks in accordance with some aspects.

FIG. 11 is a flow chart illustrating an exemplary process 1100 that may be performed by a UE or other scheduled entity to apply a one-shot HARQ-ACK feedback configuration to two HARQ-ACK codebooks in accordance with some aspects. In this example, a UE is provided with two HARQ-ACK codebooks via RRC using pdsch-HARQ-ACK-CodebookList. In particular, in this example, pdsch-HARQ-ACK-OneShotFeedback, if configured, is applied to both HARQ-ACK codebooks for the two priorities. That is, one-shot feedback is either configured for both or for none. For example, semi-static+one-shot feedback is configured for the first priority and dynamic+one-shot feedback is configured for the second priority.

Beginning at block 1102 of FIG. 11, the UE configures, receives, or obtains first and second HARQ-ACK codebooks via RRC (e.g., via pdsch-HARQ-ACK-CodebookList). At block 1104, the UE applies a one-shot HARQ-ACK feedback configuration (e.g., via pdsch-HARQ-ACK-OneShotFeedback) to both of the first and second HARQ-ACK codebooks. Thereafter, although not shown in FIG. 11, processing may proceed to prioritizing overlapping physical UL channels and then canceling or multiplexing the overlapping channels, as already discussed.

Figure 12:
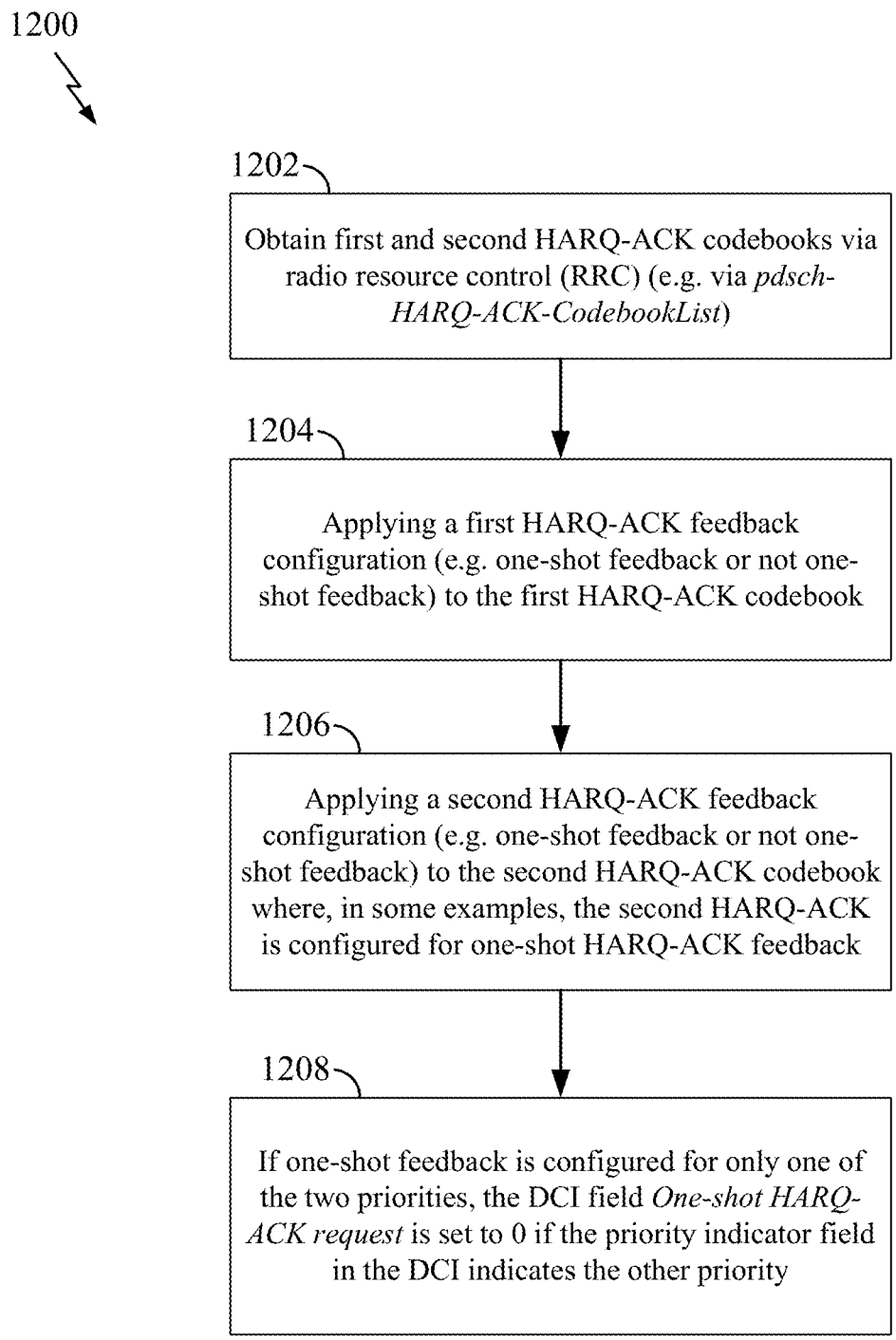
FIG. 12 is a flow chart illustrating another wireless communication method for use by a wireless communication device to apply a one-shot HARQ-ACK feedback configuration to a HARQ-ACK codebook in accordance with some aspects.

FIG. 12 is a flow chart illustrating an exemplary process 1200 that may be performed by a UE or other scheduled entity to apply a one-shot HARQ-ACK feedback configuration to a HARQ-ACK codebook in accordance with some aspects. The exemplary procedure 1200 may be employed when a UE is provided with two HARQ-ACK codebooks via RRC using pdsch-HARQ-ACK-CodebookList. However, in this example, the one-shot feedback is configured separately for the two different priorities. In particular, in this example, pdsch-HARQ-ACK-OneShotFeedback is configured separately. For example, dynamic only (with no one-shot feedback) is configured for the first priority and dynamic+one-shot is configured for the second priority. Note that if one-shot feedback is configured for only one of the priorities, the DCI field One-shot HARQ-ACK request is set to 0 if the priority indicator field in the DCI indicates the other priority.

Beginning at block 1202 of FIG. 12, the UE configures, receives, or obtains first and second HARQ-ACK codebooks via RRC (e.g., via pdsch-HARQ-ACK-CodebookList). At block 1204, the UE applies a first HARQ-ACK feedback configuration to the first HARQ-ACK codebook where, in some examples, the first HARQ-ACK is configured for one-shot HARQ-ACK feedback (e.g., via pdsch-HARQ-ACK-OneShotFeedback) and in other examples it is not configured for one-shot HARQ-ACK feedback. At block 1206, the UE applies a second HARQ-ACK feedback configuration to the second HARQ-ACK codebook where, in some examples, the second HARQ-ACK is configured for one-shot HARQ-ACK feedback and in other examples it is not configured for one-shot HARQ-ACK feedback. At block 1208, if one-shot feedback is configured for only one of the priorities, the DCI field One-shot HARQ-ACK request is set to 0 if the priority indicator field in the DCI indicates the other priority. In other words, if one-shot HARQ-ACK feedback is configured for the first but not the second priority, a DCI with a priority indicator field that is set to the second priority value will include a one-shot HARQ-ACK request field that is set to zero.

Turning now to CBGs, a UE may be configured with a maximum number of CBGs in a component carrier (CC)/serving cell (e.g., by the parameter codeBlockGroupTransmission, including maxCodeBlockGroupsPerTransportBlock, which can be set to 2, 4, 6, or 8 as the maximum number of CBGs per TB, denoted by $N_{HARQ-ACK,c}^{CBG/TB,max}$). If so, the UE reports a CBG-based HARQ-ACK (with one bit A/N for each CBG of a given TB). One-shot (Type 3) codebooks can be configured to report CBG-based HARQ-ACK (e.g., if the RRC parameter pdsch-HARQ-ACK-OneShotFeedbackCBG-r16 is enabled). In the case of two HARQ-ACK codebooks, two different max number of CBGs per TB are configured (e.g., by the RRC parameter pdsch-CodeBlockGroupTransmissionList-r16) corresponding to the two priorities: $N_{HARQ-ACK,c,1}^{CBG/TB,max}$ and $N_{HARQ-ACK,c,2}^{CBG/TB,max}$. However, for one-shot (Type 3), feedback for all HARQ-IDs is reported in Release 16 irrespective of priority as mentioned above. An issue therefore can arise as to which maximum number of CBGs per TB to use.

In a first CBG-based one-shot HARQ-ACK example, the maximum number of CBGs per TB to use is determined as follows. When the UE is provided with two maximum numbers of CBGs per TB in a given CC corresponding to two different priorities ($N_{HARQ-ACK,c,1}^{CBG/TB,max}$ and $N_{HARQ-ACK,c,2}^{CBG/TB,max}$), and the UE is configured to report CBG-based HARQ-ACK in a one-shot feedback report, and the UE is requested by a DCI to report one-shot feedback, the maximum of the two numbers is selected. That is, the number of HARQ-ACK bits for each TB of a HARQ process number for that CC in the one-shot feedback consists of max $\{N_{HARQ-ACK,c,1}^{CBG/TB,max}, N_{HARQ-ACK,c,2}^{CBG/TB,max}\}$ bits. In this case, if the actual number of CBGs for a given TB of a HARQ process in a CC is less than the number determined above, the UE generates a NACK for each of the last remaining positions in the codebook.

Figure 13:
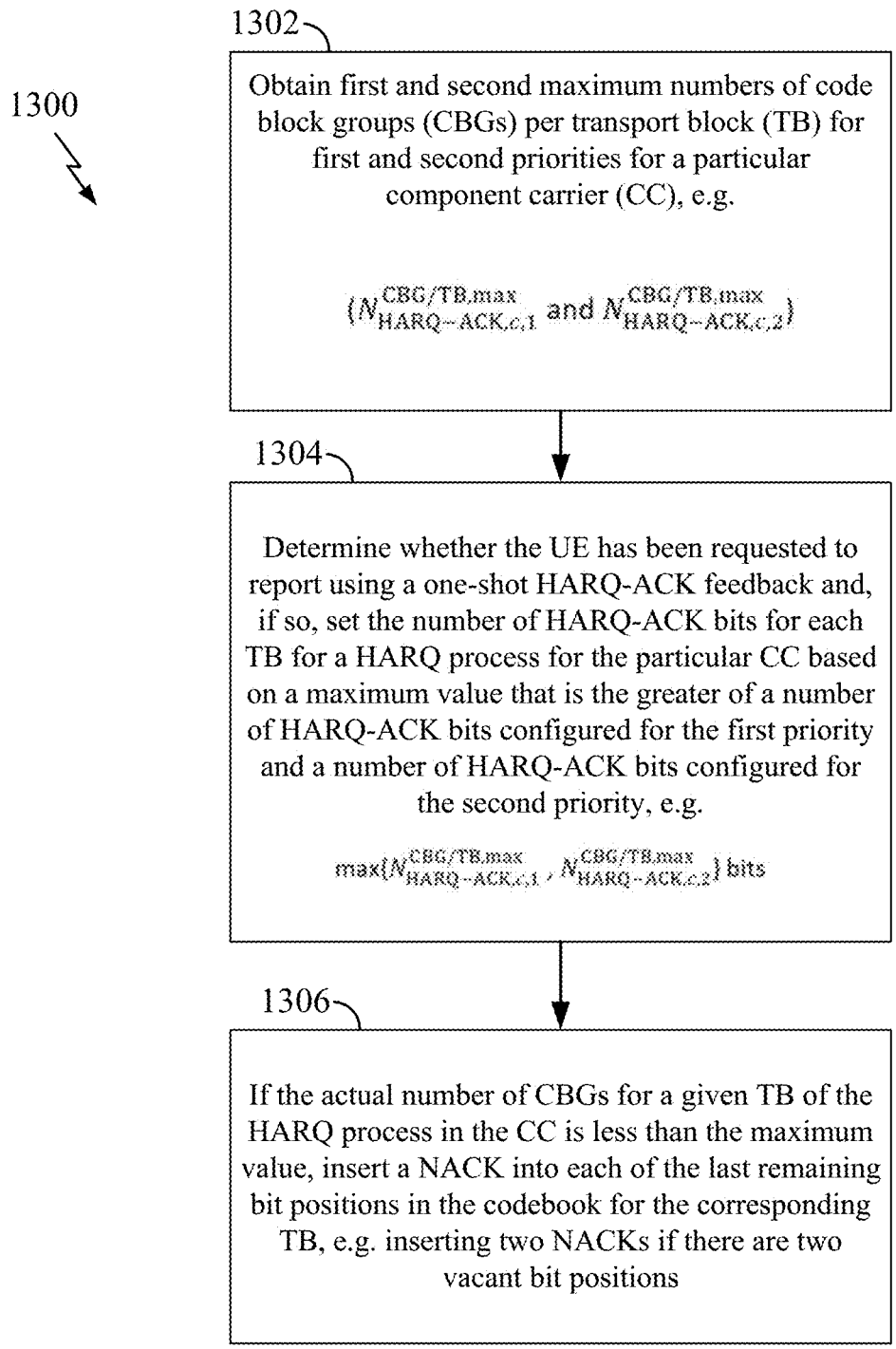
FIG. 13 is a flow chart illustrating a wireless communication method for use by a wireless communication device to insert NACK values in to vacant bit positions in a codebook according to some aspects.

FIG. 13 is a flowchart illustrating an exemplary process 1300 that may be performed by a UE or other scheduled entity to insert NACK values into vacant bit positions in a codebook according to some aspects. Beginning at block 1302 of procedure 1300, the UE configures, receives, or obtains first and second maximum numbers of CBGs per TB for first and second priorities for a particular CC, e.g., ($N_{HARQ\text{-}ACK,c,1}^{CBG/TB,max}$ and $N_{HARQ\text{-}ACK,c,2}^{CBG/TB,max}$). At block 1304, the UE determines whether the UE has been requested to report using a one-shot HARQ-ACK feedback. If so, the UE sets a number of HARQ-ACK bits for each TB for a HARQ process for the particular CC based on a maximum value that is the greater of a number of HARQ-ACK bits configured for the first priority and a number of HARQ-ACK bits configured for the second priority, e.g.: $\max\{N_{HARQ\text{-}ACK,c,1}^{CBG/TB,max}, N_{HARQ\text{-}ACK,c,2}^{CBG/TB,max}\}$ bits.

In a second CBG-based one-shot HARQ-ACK example, the maximum number of CBGs per TB to use is determined as follows. The priority indicator field of the DCI that requests the one-shot feedback determines the maximum number of CBGs and the number of HARQ-ACK bits for each TB of a HARQ process number for that CC in the one-shot feedback. This option again applies when the UE is provided with two maximum numbers of CBGs per TB in a given CC corresponding to two different priorities, the UE is configured to report CBG-based HARQ-ACK in a one-shot feedback report, and the UE is requested by a DCI to report one-shot feedback. By way of example, the first maximum number of CBGs is used if the priority indicator field is 0 and the second maximum number of CBGs is used if the priority indicator field is 1. If a TB is scheduled originally with a larger number of CBGs than the maximum number of CBGs determined for one-shot (Type 3) HARQ-ACK purposes, the UE generates HARQ-ACK bits for a new CBG that includes two or more original CBGs by applying a binary AND operation to the HARQ-ACK information bits corresponding the original CBGs. (By a binary AND, it is meant that: 0 AND 0→0; 0 AND 1→0; 1 AND 0→0; and 1 AND 1→1.)

Figure 14:
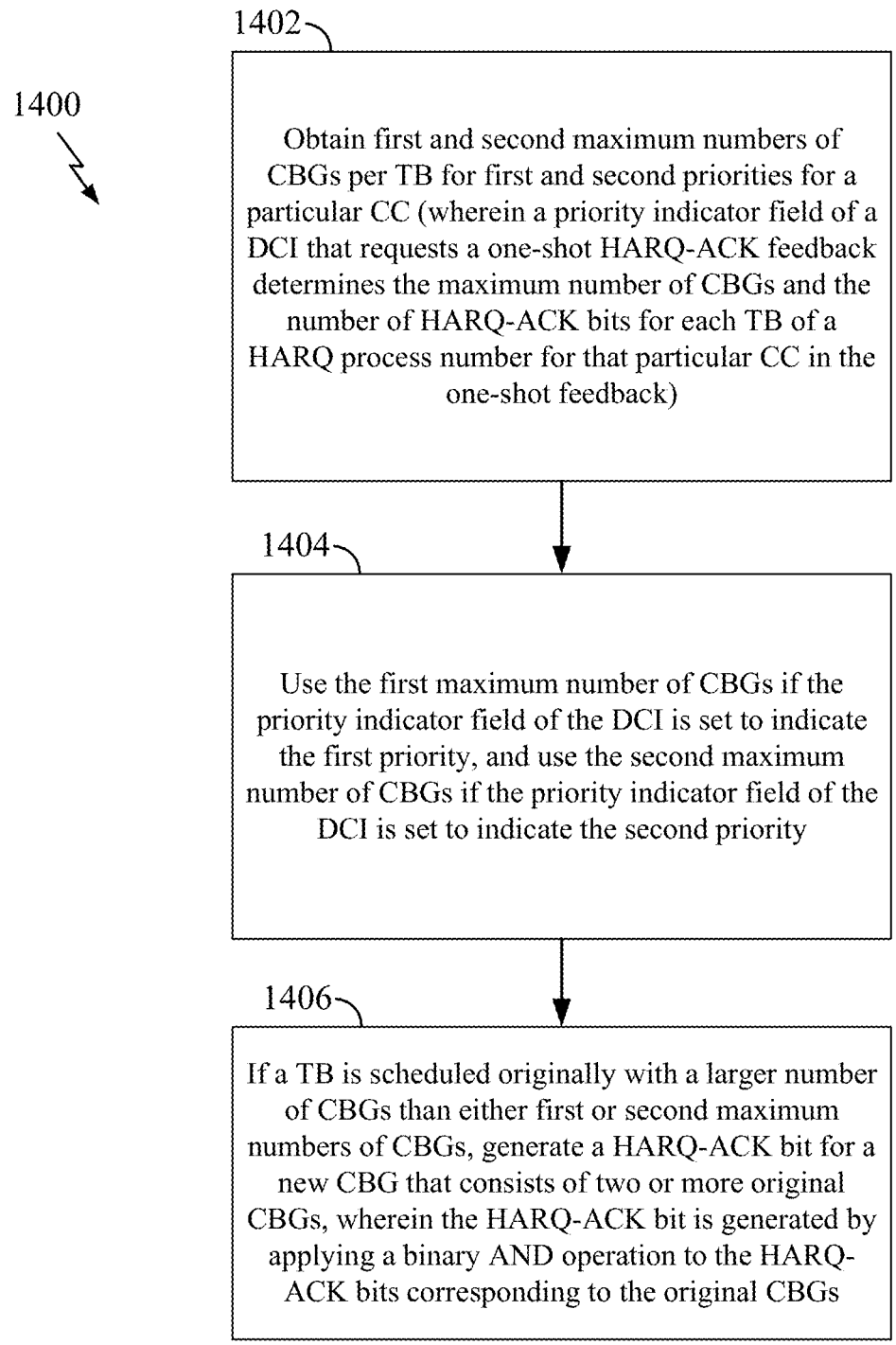
FIG. 14 is a flow chart illustrating another wireless communication method for use by a wireless communication device to insert NACK values in to vacant bit positions in a codebook according to some aspects.

FIG. 14 is a flowchart illustrating an exemplary process 1400 that may be performed by a UE or other scheduled entity to insert NACK values into vacant bit positions in a codebook according to some aspects. Beginning at block 1402 of procedure 1400, the UE configures, receives, or obtains first and second maximum numbers of CBGs per TB for first and second priorities for a particular component carrier CC. Here, a priority indicator field of a DCI that requests a one-shot HARQ-ACK feedback determines the maximum number of CBGs and the number of HARQ-ACK bits for each TB of a HARQ process number for that particular CC in the one-shot feedback. At block 1404, the UE uses or selects the first maximum number of CBGs if the priority indicator field of the DCI is set to indicate the first priority, and the UE uses or otherwise selects the second maximum number of CBGs if the priority indicator field of the DCI is set to indicate the second priority. At block 1406, if a TB is scheduled originally with a larger number of CBGs than either first or second maximum numbers of CBGs, the UE generates a HARQ-ACK bit for a new CBG that includes two or more original CBGs, where the HARQ-ACK bit is generated by applying a binary AND operation to the HARQ-ACK bits corresponding to the original CBGs.

In a third CBG-based one-shot HARQ-ACK example, if the maximum number of CBGs for the two priorities are different, or only one of the priorities is CBG-based, the UE will only expect to be configured with TB level A/N reporting for one-shot (e.g., the UE does not expect to be configured with CBG-based feedback for one-shot feedback). In this example, the UE is configured with TB level ACK/NACK reporting for one-shot feedback without using CBG-based feedback for one-shot feedback.

Figure 15:
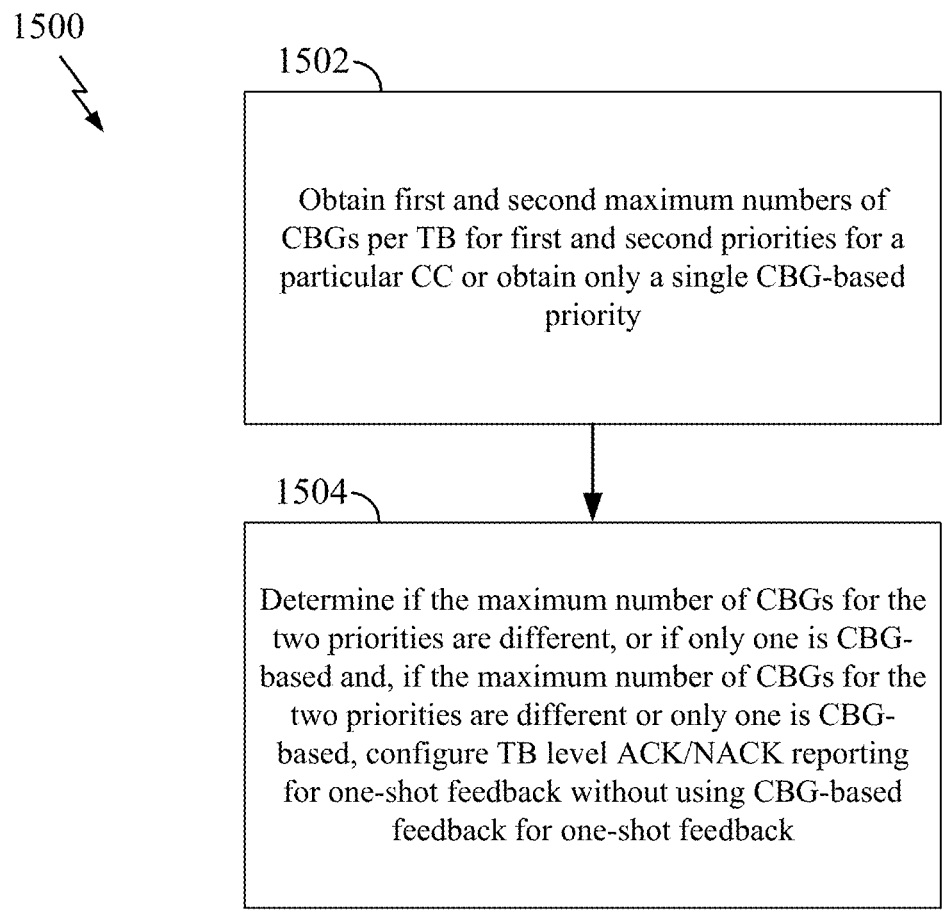
FIG. 15 is a flow chart illustrating a wireless communication method for use by a wireless communication device to configure transport block (TB) level ACK/NACK reporting according to some aspects.

FIG. 15 is a flowchart illustrating an exemplary process 1500 that may be performed by a UE or other scheduled entity to configure TB level ACK/NACK reporting according to some aspects. Beginning at block 1502 of procedure 1500, the UE obtains first and second maximum numbers of CBGs per TB for first and second priorities for a particular CC or obtains only a single CBG-based priority. At block 1504, the UE determines if the maximum number of CBGs for the two priorities are different, or if only one is CBG-based. If so (e.g., if the maximum number of CBGs for the two priorities are different or only one is CBG-based), the UE configures TB level ACK/NACK reporting for one-shot feedback without using CBG-based feedback for one-shot feedback.

Figure 16:
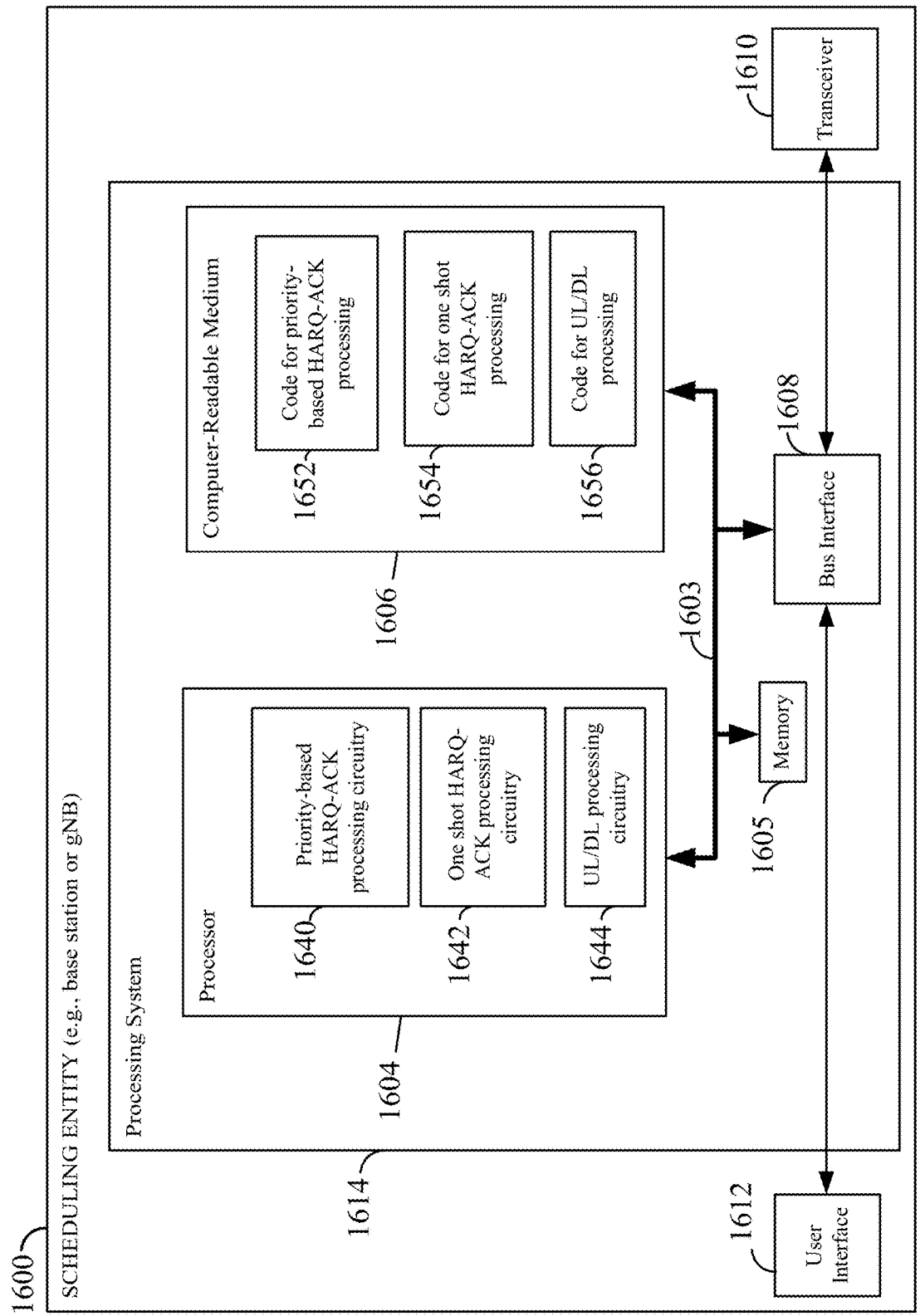
FIG. 16 is a block diagram illustrating an example of a hardware implementation for a scheduling entity according to some aspects.

FIG. 16 is a block diagram illustrating an example of a hardware implementation for a scheduling entity 1600 employing a processing system 1614 capable of processing HARQ-ACKs including both priority-based HARQ-ACKs and one-shot HARQ-ACKs according to some aspects.

In one example, the scheduling entity 1600 of FIG. 16 may be a base station or gNB as illustrated in any one or more of the other figures (although it may also be a UE).

The scheduling entity 1600 may be implemented with a processing system 1614 that includes one or more processors 1604. Examples of processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1600 may be configured to perform any one or more of the functions described herein. That is, the processor 1604, as utilized in a scheduling entity 1600, may be used to implement any one or more of the processes and procedures described elsewhere herein.

The processor 1604 may in some instances be implemented via a baseband or modem chip and in other implementations, the processor 1604 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In the example of FIG. 16, the processing system 1614 may be implemented with a bus architecture, represented generally by the bus 1602. The bus 1602 may include any number of interconnecting buses and bridges depending on the specific application of the processing system 1614 and the overall design constraints. The bus 1602 communicatively couples together various circuits including one or more processors (represented generally by the processor 1604), a memory 1605, and computer-readable media (represented generally by the computer-readable medium 1606). The bus 1602 may also link various other circuits such as timing sources, peripherals, voltage regulators, and power management circuits, which are well known in the art, and therefore, will not be described any further. A bus interface 1608 provides an interface between the bus 1602 and a transceiver 1610. The transceiver 1610 provides a communication interface or means for communicating with various other apparatus over a transmission medium. Depending upon the nature of the apparatus, a user interface 1612 (e.g., keypad, display, speaker, microphone, joystick) may also be provided.

In some aspects of the disclosure, the processor 1604 may include circuitry configured to implement one or more of the base station-side functions described elsewhere herein. The processor 1604 may include priority-based HARQ-ACK processing circuitry 1640, one shot HARQ-ACK processing circuitry 1642, and UL/DL processing circuitry 1644.

The processor 1604 is responsible for managing the bus 1602 and general processing, including the execution of software stored on the computer-readable medium 1606. The software, when executed by the processor 1604, causes the processing system 1614 to perform the various functions described below for any particular apparatus. The computer-readable medium 1606 and the memory 1605 may also be used for storing data that is manipulated by the processor 1604 when executing software.

One or more processors 1604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1606. The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1606 may reside in the processing system 1614, external to the processing system 1614, or distributed across multiple entities including the processing system 1614. The computer-readable medium 1606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The computer-readable storage medium 1606 may include software executable by the processor 1604 configured to implement one or more of the functions described elsewhere herein. For example, the computer-readable storage medium 1606 may include code for priority-based HARQ-ACK processing 1652 executable by the priority-based HARQ-ACK processing circuitry 1640, code for one shot HARQ-ACK processing 1654 executable by the one shot HARQ-ACK processing circuitry 1642, and code for UL/DL processing 1656 executable by the UL/DL processing circuitry 1644.

Figure 17:
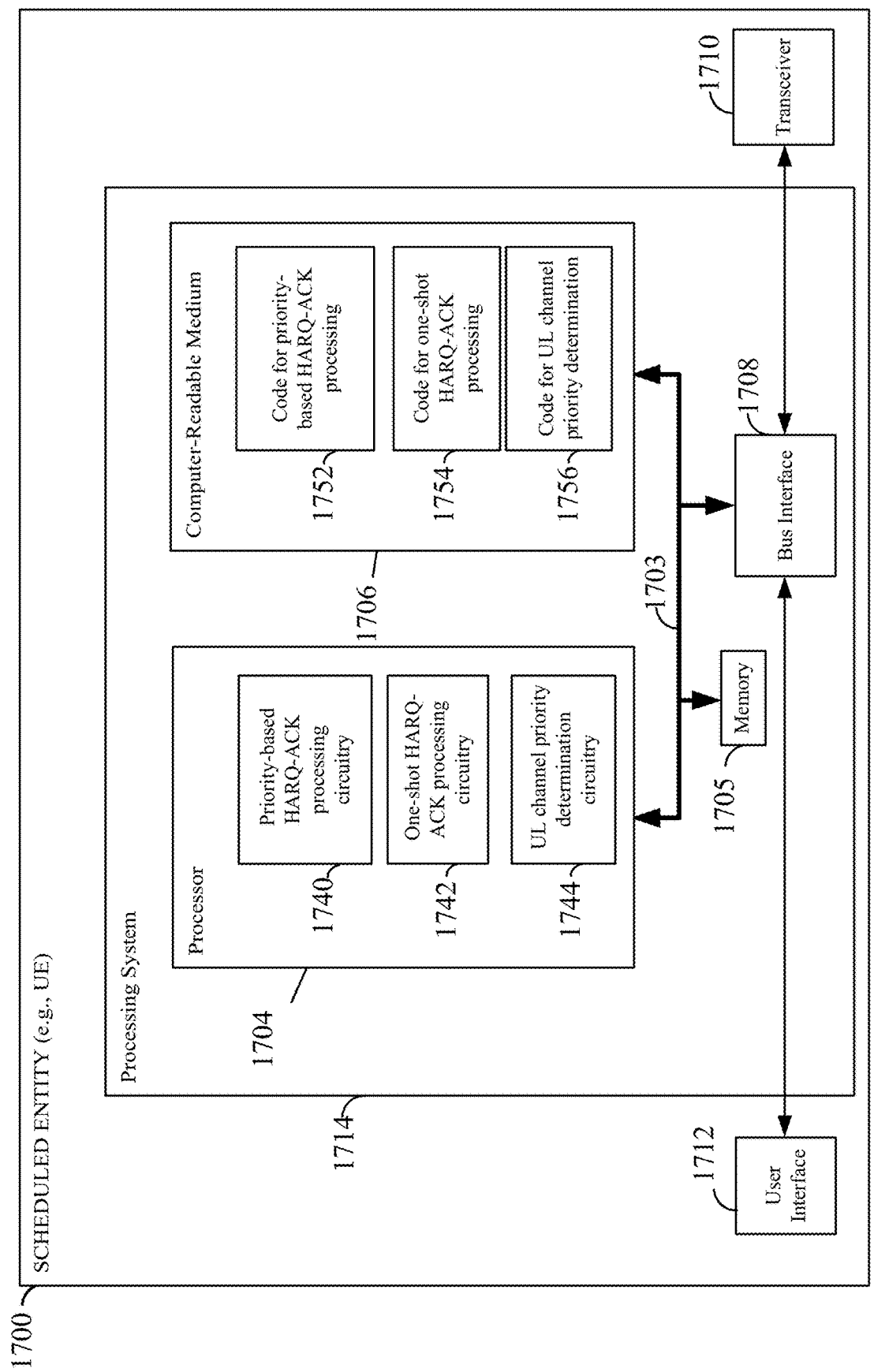
FIG. 17 is a block diagram illustrating an example of a hardware implementation for a scheduled entity according to some aspects.

FIG. 17 is a block diagram illustrating an example of a hardware implementation for an exemplary scheduled entity 1700 employing a processing system 1714, which may be, for example, a UE. In accordance with various aspects of the disclosure, an element, or any portion of an element, or any combination of elements may be implemented with a processing system 1714 that includes one or more processors 1704. For example, the scheduled entity 1700 may be a UE as illustrated in any one or more of the other figures.

The processing system 1714 may be generally similar to the processing system 1614 illustrated in FIG. 16, including a bus interface 1708, a bus 1702, memory 1705, a processor 1704, a computer-readable medium 1706, a user interface 1712, and a transceiver 1710 (a communication interface) similar to those described above, and so many of the details of the system architecture will not be described again. The processor 1704 may in some instances be implemented via a baseband or modem chip and in other implementations, the processor 1704 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

The processor 1704, as utilized in a scheduled entity 1700, may be used to implement one or more of the various processes described herein for use by scheduled entities, such as UEs. In some aspects of the disclosure, the processor 1704 includes priority-based HARQ-ACK processing circuitry 1740 configured for priority-based HARQ-ACK processing including processing using codebooks of differing indicated priorities; one-shot HARQ-ACK processing circuitry 1742 configured for one-shot HARQ-ACK processing including processing one-shot codebooks; and UL Channel Priority Determination circuitry 1744 configured for determining UL Channel Priority and for canceling or multiplexing overlapping channels, using the various procedures of FIGS. 4-16. Processing circuitry 1740 and 1742 may comprise processing circuitry configured for obtaining and/or configuring a plurality of HARQ-ACK codebooks, wherein the plurality of HARQ-ACK codebooks comprise priority-based HARQ-ACK codebooks of differing priorities and separate one-shot HARQ-ACK codebooks, in accordance with the various processes illustrated in FIGS. 4-16. Circuitry 1744 may comprise processing circuitry configured for processing first and second physical uplink channels based at least in part on a priority of the first physical uplink channel and a priority of the second physical uplink channel, wherein one of the first and second physical uplink channels comprises a one-shot HARQ-ACK codebook, and wherein the processing is performed in combination with the use of the priority-based HARQ-ACK codebooks, in accordance with the various processes illustrated in FIGS. 4-16.

The computer-readable storage medium 1706 may include software executable by processor 1704 configured to implement one or more of the functions described elsewhere herein. For example, the computer-readable storage medium 1706 may include code for priority-based HARQ-ACK processing 1752 executable by the priority-based HARQ-ACK processing circuitry 1740; code for one-shot HARQ-ACK processing 1754 executable by the one shot-based HARQ-ACK processing circuitry 1742; and code for determining UL Channel Priority and for canceling or multiplexing overlapping channels 1756 executable by the UL Channel priority determination circuitry 1744, in accordance with the various processes illustrated in FIGS. 4-16.

Figure 18:
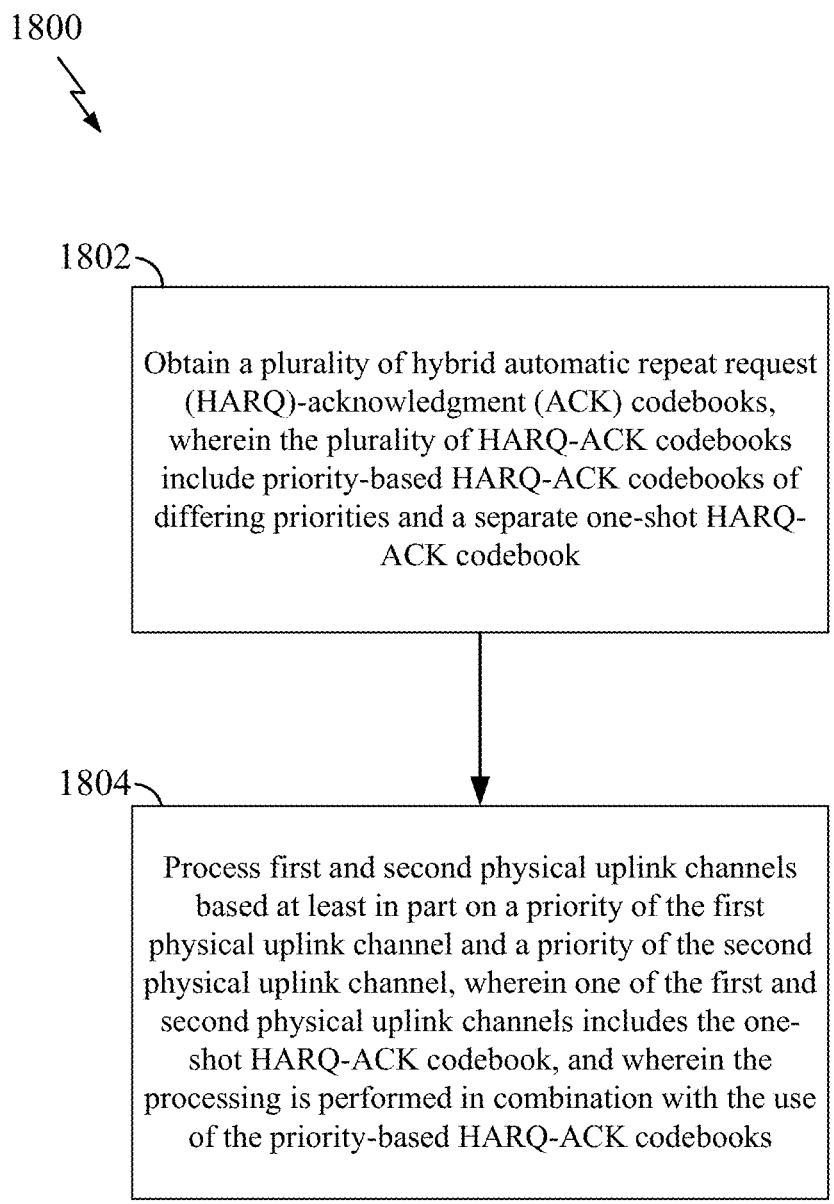
FIG. 18 is a flow chart illustrating a wireless communication method for use by a wireless communication device when one-shot HARQ-ACK codebook is used in accordance with some aspects.

FIG. 18 is a flow chart illustrating a wireless communication method 1800 according to some aspects of the disclosure. As described below, some or all illustrated features may be omitted in a particular implementation within the scope of the present disclosure, and some illustrated features may not be required for implementation of all examples. The communication method 1800 may be performed, for example, by any of the scheduled entities illustrated in the figures, such as a UE, or by other suitably-equipped systems, devices or apparatus including a wireless communication device.

At block 1802, the wireless communication device obtains a plurality of HARQ-ACK codebooks, wherein the plurality of HARQ-ACK codebooks includes priority-based HARQ-ACK codebooks of differing priorities and a separate one-shot HARQ-ACK codebook. For example, the priority-based HARQ-ACK processing circuitry 1640 together with the one shot HARQ-ACK processing circuitry 1642 shown and described above in connection with FIG. 16 may provide a means to obtain the plurality of HARQ-ACK codebooks.

At block 1804, the wireless communication device processes first and second physical uplink channels based at least in part on a priority of the first physical uplink channel and a priority of the second physical uplink channel, wherein one of the first and second physical uplink channels includes the one-shot HARQ-ACK codebook, and wherein the processing is performed in combination with the use of the priority-based HARQ-ACK codebooks. For example, the UL/DL processing circuitry 1644, together with the priority-based HARQ-ACK processing circuitry 1640 and the one shot HARQ-ACK processing circuitry 1642, shown and described above in connection with FIG. 16 may provide a means to process the first and second physical uplink channels.

In one configuration, an apparatus for wireless communication includes means for performing the methods and processes as described above, including means for communicating as described above. In one aspect, the aforementioned means may be the processor(s) of FIGS. 16 and 17 configured to perform the functions recited by the aforementioned means. In another aspect, the aforementioned means may be a circuit or any apparatus configured to perform the functions recited by the aforementioned means.

Figure 19:
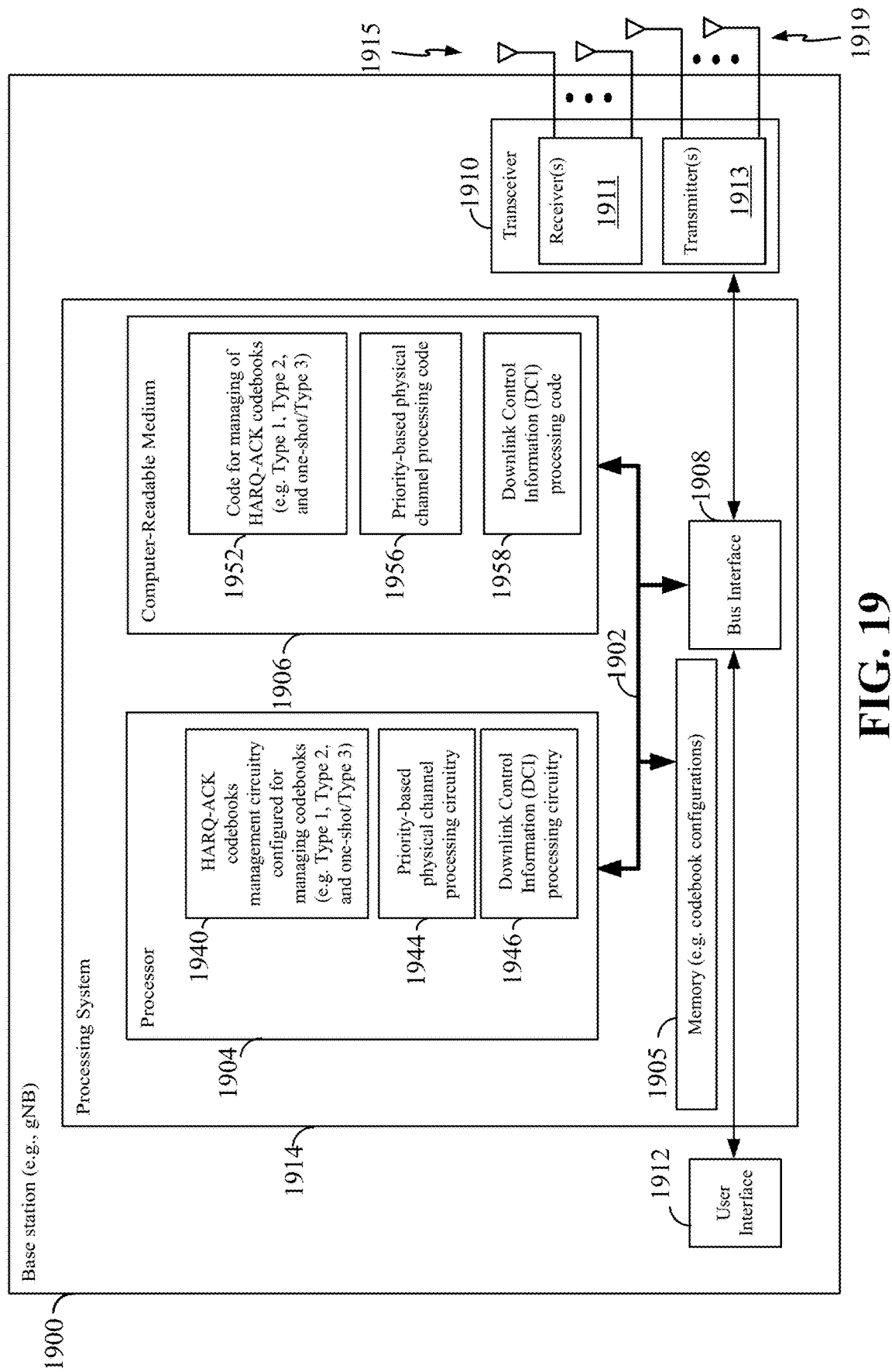
FIG. 19 is a block diagram illustrating an example of a hardware implementation for base station according to some aspects.

FIG. 19 is a block diagram illustrating an example of a hardware implementation for an exemplary base station 1900 (e.g., gNB or scheduling entity) employing a processing system 1914. In accordance with various aspects of the disclosure, an element, or any portion of an element, or any combination of elements may be implemented with a processing system 1914 that includes one or more processors 1904. The processing system 1914 may be generally similar to the processing system 1614 illustrated in FIGS. 16 and 17, including a bus interface 1908, a bus 1902, memory 1905, a processor 1904, a computer-readable medium 1906, a user interface 1912, and a transceiver 1910. The transceiver 1910 provides a communication interface or means for communicating with various other apparatus over a transmission medium. The transceiver 1910 includes one or more receivers 1911 and one or more transmitters 1913. The receiver(s) 1911 are coupled to a set of antennas 1915. The transmitter(s) 1913 are coupled to the same or a different set of antennas 1917. The sets of antennas may be used for beamforming. Depending upon the nature of the apparatus, a user interface 1912 (e.g., keypad, display, speaker, microphone, joystick) may also be provided.

The processor 1904 may in some instances be implemented via a baseband or modem chip and in other implementations, the processor 1904 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

The processor 1904, as utilized in a base station 1900, may be used to implement one or more of the various processes described herein for use by base stations. In some aspects of the disclosure, the processor 1904 includes HARQ-ACK codebooks management circuitry 1940 configured for managing codebooks (e.g., Type 1, Type 2, and one-shot/Type 3); physical channel processing circuitry 1944; and DCI processing circuitry 1946, where the circuits are configured to perform functions that correspond to, or are complimentary with, the various UE-side functions or operations describe herein. In this regard, the base station may generate and send signals to configure a UE to provide HARQ feedback for different CORESET groups. Additionally, the base station may configure the UE with one or more codebooks to use for generating one or more feedback messages, such as the priority based HARQ-ACK codebooks (e.g., a dynamic Type 2 HARQ-ACK codebook or a semi-static Type 1 HARQ-ACK codebook) and/or the one-shot Type 3 HARQ-ACK codebook. The codebooks may be stored in memory 1905.

The computer-readable storage medium 1906 may include software executable by the processor 1904 configured to implement one or more of the functions described herein. For example, the computer-readable storage medium 1906 may include code for managing of HARQ-ACK codebooks (e.g., Type 1, Type 2, and one-shot/Type 3) 1952 executable by HARQ-ACK codebooks management circuitry 1940; code for physical channel processing 1956 executable by the physical channel processing circuitry 1944; and code for DCI processing 1958 executable by the DCI processing circuitry 1946.

Figure 20:
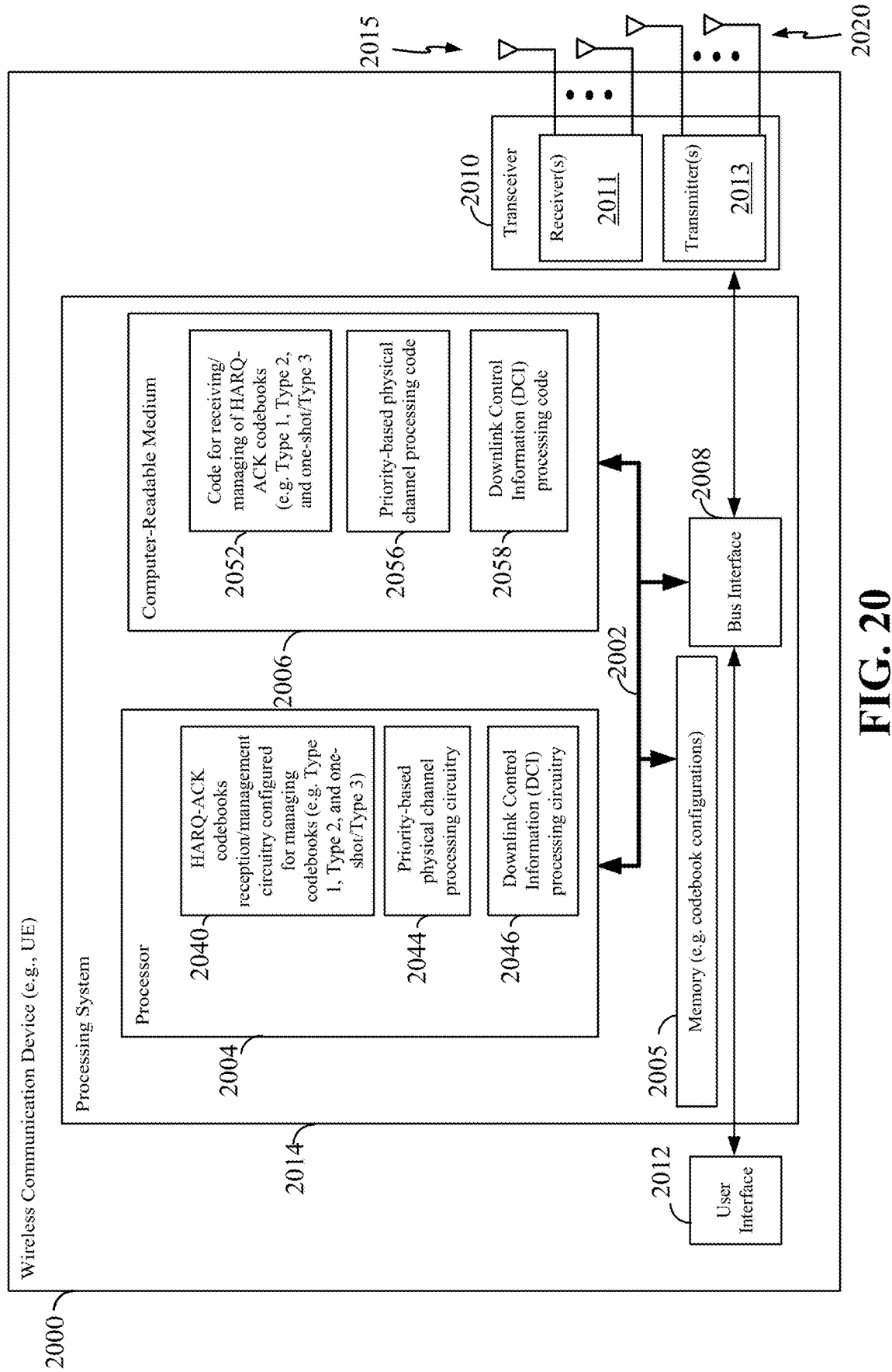
FIG. 20 is a block diagram illustrating an example of a hardware implementation for UE according to some aspects.

FIG. 20 is a block diagram illustrating an example of a hardware implementation for an exemplary wireless communication device 2000 (e.g., UE or scheduled entity) employing a processing system 2014. In accordance with various aspects of the disclosure, an element, or any portion of an element, or any combination of elements may be implemented with a processing system 2014 that includes one or more processors 2004. The processing system 2014 may be generally similar to the processing system 1614 illustrated in FIGS. 16-17 and 19, including a bus interface 2008, a bus 2002, memory 2005, a processor 2004, a computer-readable medium 2006, a user interface 2012, and a transceiver 2010. The transceiver 2010 provides a communication interface or means for communicating with various other apparatus over a transmission medium. The transceiver 2010 includes one or more receivers 2011 and one or more transmitters 2013. The receiver(s) 2011 are coupled to a set of antennas 2015. The transmitter(s) 2013 are coupled to the same or a different set of antennas 2017. The sets of antennas may be used for beamforming. Depending upon the nature of the apparatus, a user interface 2012 (e.g., keypad, display, speaker, microphone, joystick) may also be provided.

The processor 2004 may in some instances be implemented via a baseband or modem chip and in other implementations, the processor 2004 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

The processor 2004, as utilized in a wireless communication device 2000, may be used to implement one or more of the various processes described herein for use by UEs. In some aspects of the disclosure, the processor 2004 includes HARQ-ACK codebooks reception/management circuitry 2040 configured for receiving/managing codebooks (e.g., Type 1, Type 2, and one-shot/Type 3); priority-based physical channel processing circuitry 2044; and DCI processing circuitry 2046, where the circuits are configured to perform functions that correspond to, or are complimentary with, the various base station-side functions or operations describe herein. For example, HARQ-ACK codebooks reception/management circuitry 2040 provides circuitry configured to: obtain a plurality of HARQ-ACK codebooks, wherein the plurality of HARQ-ACK codebooks include priority-based HARQ-ACK codebooks of differing priorities and a separate one-shot HARQ-ACK codebook.

The computer-readable storage medium 2006 may include software executable by the processor 2014 configured to implement one or more of the functions described herein. For example, the computer-readable storage medium 2006 may include code for receiving/managing of HARQ-ACK codebooks (e.g., Type 1, Type 2, and one-shot/Type 3) 2052 executable by the HARQ-ACK codebooks reception/management circuitry 2040; code for priority-based physical channel processing 2056 executable by the priority-based physical channel processing circuitry 2044; and code for DCI processing 2058 executable by the DCI processing circuitry 2046. The codebooks may be stored in the memory 2005.

The HARQ-ACK codebooks reception/management circuitry 2040 may be configured to obtain one or more HARQ-ACK codebooks that include priority-based HARQ-ACK codebooks of differing priorities and a separate one-shot codebook. The HARQ-ACK codebooks reception/management circuitry 2040 may be configured to obtain the HARQ-ACK codebooks by receiving the codebooks from a base station or by generating the codebooks based on configuration information provided by the base station and/or from stored information within the UE. The HARQ-ACK codebooks reception/management circuitry 2040 may additionally or alternatively be referred to as HARQ-ACK codebooks reception circuitry, obtainment circuitry, determination circuitry or configuration circuitry. The DCI processing circuitry 2046 may be configured to receive DCI from a base station or otherwise obtain or determine DCI. The DCI processing circuitry 2046 may instead be referred to as DCI reception circuitry, obtainment circuitry, determination circuitry or configuration circuitry.

The priority-based physical channel processing circuitry 2044 may be configured to process first and second physical uplink channels based at least in part on a priority of the first physical uplink channel and a priority of the second physical uplink channel, wherein one of the first and second physical uplink channels includes the one-shot HARQ-ACK codebook, and wherein the processing is performed in combination with the use of the priority-based HARQ-ACK codebooks. In some examples, the priority-based HARQ-ACK codebooks include one or more of a Type 1 semi-static codebook (having first and second priorities, e.g., high and low) and a Type 2 dynamic codebook (having first and second priorities, e.g., high and low) and the one-shot HARQ-ACK codebooks includes a Type 3 codebook.

In some aspects, the HARQ-ACK codebooks reception/management circuitry 2040 provides a means for obtaining a plurality of HARQ-ACK codebooks, wherein the plurality of HARQ-ACK codebooks comprise priority-based HARQ-ACK codebooks of differing priorities and a separate one-shot HARQ-ACK codebook. The priority-based physical channel processing circuitry 2044 provides a means for processing first and second physical uplink channels based at least in part on a priority of the first physical uplink channel and a priority of the second physical uplink channel, wherein one of the first and second physical uplink channels includes the one-shot HARQ-ACK codebook, and wherein the processing is performed in combination with the use of the priority-based HARQ-ACK codebooks.

In some aspects, the code 2052 for receiving/managing of HARQ-ACK codebooks provides instructions executable by one or more processors of the wireless communication device to obtain a plurality of HARQ-ACK codebooks, wherein the plurality of HARQ-ACK codebooks comprise priority-based HARQ-ACK codebooks of differing priorities and a separate one-shot HARQ-ACK codebook. The priority-based physical channel processing code 2056 provides instructions executable by one or more processors of the wireless communication device to process first and second physical uplink channels based at least in part on a priority of the first physical uplink channel and a priority of the second physical uplink channel, wherein one of the first and second physical uplink channels includes the one-shot HARQ-ACK codebook, and wherein the processing is performed in combination with the use of the priority-based HARQ-ACK codebooks.

Additional features of the priority-based physical channel processing circuitry 2044 for use with one-shot HARQ-ACK feedback are shown in FIG. 21.

In some aspects, the priority-based physical channel processing circuitry 2044 is configured, as shown in block 2102 of FIG. 21, to process the first and second physical uplink channels (with one of the channels using one-shot HARQ-ACK feedback) by canceling one of the first and second physical uplink channels when the first and second physical uplink channels overlap in time based on a respective priority of each of the first and second physical uplink channels. That is, circuitry is provided for canceling one of two physical UL channels when the two UL channels overlap in time based on a respective priority of the two physical UL channels (when one of the channels uses one-shot HARQ-ACK feedback). See, for example, FIGS. 5-10.

In some aspects, the priority-based physical channel processing circuitry 2044 is configured, as shown in block 2104 of FIG. 21, to process the first and second physical uplink channels by multiplexing the first and second physical uplink channels when the first and second physical uplink channels overlap in time and are of equal priority. See, for example, FIGS. 7-8. That is, circuitry is provided for multiplexing two physical UL channels when the two UL channels overlap in time and are of equal priority (when one of the channels uses one-shot feedback).

In some aspects, at least one of the first and second physical uplink channels comprises a PUCCH or a PUSCH. See, for example, FIG. 4.

In some aspects, the priority-based physical channel processing circuitry 2044 is configured to process the first and second physical uplink channels by: determining a priority for the first physical uplink channel; receiving DCI (via the DCI processing circuitry 2046) triggering the second physical uplink channel requesting the use of the one-shot HARQ-ACK codebook; assigning a priority to the second physical uplink channel; and canceling the first physical uplink channel when the first physical uplink channel has a lower priority compared to the second physical uplink channel, canceling the second physical uplink channel when the second physical uplink channel has a lower priority compared to the first physical uplink channel, and multiplexing the first and second physical uplink channels when both have equal priority. See, for example, FIG. 6.

In some aspects, as shown by block 2106 of FIG. 21, the priority-based physical channel processing circuitry 2044 is configured to assign the priority to the second physical uplink channel by assigning the second physical uplink channel a high priority irrespective of a priority indicator field of the DCI. That is, circuitry is provided for assigning a priority to a physical UL channel irrespective of DCI. See, for example, FIG. 6. In other aspects, as shown by block 2108 of FIG. 21, the priority-based physical channel processing circuitry 2044 is configured to assign the priority to the second physical uplink channel by: determining whether the DCI includes an indication of priority; and, in response to the DCI including the indication of priority, selecting the priority for the second physical uplink channel based on the DCI; or, in response to the DCI not including the indication of priority, selecting the priority for the second physical uplink channel based on a predetermined priority set to either low or high. That is, circuitry is provided for assigning a priority to a physical UL channel based on a DCI with a priority indicator. See, for example, FIG. 7.

In some aspects, as shown by way of block 2110 of FIG. 21, the priority-based physical channel processing circuitry 2044 is further configured to receive an additional DCI (via the DCI processing circuitry 2046) for the second physical uplink channel that requests the one-shot HARQ-ACK codebook and includes a priority indicator; and select the priority for the second physical uplink channel based on the priority indicator of the additional DCI. That is, circuitry is provided for assigning a priority to a physical UL channel based on a second or additional DCI with a priority indicator. See, for example, FIG. 8.

In other aspects, the priority-based physical channel processing circuitry 2044 is further configured to: receive an additional DCI that requests the one-shot HARQ-ACK codebook and includes a priority indicator different from the indication of priority in the DCI; and select the priority for the second physical uplink channel by assigning the second physical uplink channel a high priority. See, for example, FIG. 8.

In some aspects, the priority-based physical channel processing circuitry 2044 is configured to assign the priority to the second physical uplink channel by: setting the priority of the second physical uplink channel to a high priority when at least one reported HARQ-ACK bit in the one-shot HARQ-ACK codebook for a given HARQ process corresponding to a PDSCH that is scheduled by the DCI has a priority indicator field set to high priority; and setting the priority of the second physical uplink channel to low priority when the priority indicator field is set to low priority. See, for example, FIG. 9.

In some aspects, at least one of the first and second physical uplink channels is a PUCCH with the one-shot HARQ-ACK codebook and the other of the first and second physical uplink channels is a PUSCH that time overlaps with the PUCCH. In that case, the priority-based physical channel processing circuitry 2044 may be configured to process the first and second physical uplink channels by: multiplexing the PUCCH with the PUSCH when the PUCCH with the one-shot HARQ-ACK feedback codebook has a high priority and the PUSCH has a low priority; and multiplexing the PUCCH with the PUSCH when the PUCCH with the one-shot HARQ-ACK feedback codebook has the low priority and the PUSCH has the high priority. See, for example, FIG. 10.

In some aspects, the HARQ-ACK codebooks reception/management circuitry 2040 is further configured to obtain first and second HARQ-ACK codebooks via an RRC configuration and to provide one-shot HARQ-ACK feedback via the RRC configuration. In such as case, the priority-based physical channel processing circuitry 2044 may be configured, as shown in block 2112 of FIG. 21, to apply a one-shot HARQ-ACK feedback configuration to both of the first and second HARQ-ACK codebooks. See, for example, FIGS. 11 and 12.

In some aspects, the priority-based physical channel processing circuitry 2044 may be configured for use with first and second maximum numbers of CBGs per TB for first and second priorities, respectively, for a CC, and, if so, the priority-based physical channel processing circuitry 2044 is further configured, as represented by block 2114 of FIG. 21, to set a number of HARQ-ACK bits for each TB for a one-shot HARQ feedback process for the particular CC based on a maximum value that is the greater of a number of HARQ-ACK bits configured for the first priority and a number of HARQ-ACK bits configured for the second priority. See, for example, FIGS. 13-15.

Of course, in the above examples, the circuitry included in the processors of FIGS. 16-17 and 18-21 is merely provided as an example, and other means for carrying out the described functions may be included within various aspects of the present disclosure, including but not limited to the instructions stored in the computer-readable storage media FIGS. 16-17 and 18-21, or any other suitable apparatus or means described in any one of the figures and utilizing, for example, the processes and/or algorithms described herein in relation to the figures.

The following provides an overview of examples of the present disclosure.

Example 1: wireless communication device, comprising: a transceiver; a memory; and a processor communicatively coupled to the transceiver and the memory, wherein the processor is configured to: obtain a plurality of HARQ-ACK codebooks, wherein the plurality of HARQ-ACK codebooks comprise priority-based HARQ-ACK codebooks of differing priorities and a separate one-shot HARQ-ACK codebook; and process first and second physical uplink channels based at least in part on a priority of the first physical uplink channel and a priority of the second physical uplink channel, wherein one of the first and second physical uplink channels includes the one-shot HARQ-ACK codebook, and wherein the processing is performed in combination with the use of the priority-based HARQ-ACK codebooks.

Example 2: the wireless communication device of example 1, wherein the wherein the priority-based HARQ-ACK codebooks are configured as one or more of a Type 1 semi-static codebook and a Type 2 dynamic codebook; and wherein the one-shot HARQ-ACK codebook is configured as a Type 3 codebook Example 3: the wireless communication device of examples 1 or 2, wherein the processor is further configured to process the first and second physical uplink channels by canceling one of the first and second physical uplink channels when the first and second physical uplink channels overlap in time based on a respective priority of each of the first and second physical uplink channels.

Example 4: the wireless communication device of examples 1 or 2, wherein the processor is further configured to process the first and second physical uplink channels by multiplexing the first and second physical uplink channels when the first and second physical uplink channels overlap in time and are of equal priority.

Example 5: the wireless communication device of examples 1, 2, 3, or 4, wherein the first and second physical uplink channels comprise one or more of a PUCCH and a PUSCH.

Example 6: the wireless communication device of examples 1, 2, 3, 4, or 5, wherein the processor is further configured to process the first and second physical uplink channels by: determining a priority for the first physical uplink channel; receiving DCI triggering the second physical uplink channel requesting the use of the one-shot HARQ-ACK codebook; assigning a priority to the second physical uplink channel; and canceling the first physical uplink channel when the first physical uplink channel has a lower priority compared to the second physical uplink channel, canceling the second physical uplink channel when the second physical uplink channel has a lower priority compared to the first physical uplink channel, and multiplexing the first and second physical uplink channels when both have equal priority.

Example 7: the wireless communication device of examples 1, 2, 3, 4, 5, or 6, wherein the processor is further configured to assign the priority to the second physical uplink channel by assigning the second physical uplink channel a high priority irrespective of a priority indicator field of the DCI.

Example 8: the wireless communication device of examples 1, 2, 3, 4, 5, or 6, wherein the processor is further configured to assign the priority to the second physical uplink channel by: determining whether the DCI includes an indication of priority; in response to the DCI including the indication of priority, selecting the priority for the second physical uplink channel based on the DCI; and in response to the DCI not including the indication of priority, selecting the priority for the second physical uplink channel based on a predetermined priority set to either low or high.

Example 9: the wireless communication device of examples 1, 2, 3, 4, 5, 6, or 8, wherein the processor is further configured to: receive an additional DCI for the second physical uplink channel that requests the one-shot HARQ-ACK codebook and includes a priority indicator; and select the priority for the second physical uplink channel based on the priority indicator of the additional DCI.

Example 10: the wireless communication device of examples 1, 2, 3, 4, 5, 6, or 8, wherein the processor is further configured to: receive an additional DCI that requests the one-shot HARQ-ACK codebook and includes a priority indicator different from the indication of priority in the DCI; and select the priority for the second physical uplink channel by assigning the second physical uplink channel a high priority.

Example 11: the wireless communication device of examples 1, 2, 3, 4, 5, or 6, wherein the processor is further configured to assign the priority to the second physical uplink channel by: setting the priority of the second physical uplink channel to a high priority when at least one reported HARQ-ACK bit in the one-shot HARQ-ACK codebook for a given HARQ process corresponding to a PDSCH that is scheduled by the DCI has a priority indicator field set to high priority; and setting the priority of the second physical uplink channel to low priority when the priority indicator field is set to low priority.

Example 12: the wireless communication device of examples 1, 2, 3, 4, or 5, wherein at least one of the first and second physical uplink channels is a PUCCH with the one-shot HARQ-ACK codebook and the other of the first and second physical uplink channels is a PUSCH that time overlaps with the PUCCH, and wherein the processor is further configured to process the first and second physical uplink channels by: multiplexing the PUCCH with the PUSCH when the PUCCH with the one-shot HARQ-ACK feedback codebook has a high priority and the PUSCH has a low priority; and multiplexing the PUCCH with the PUSCH when the PUCCH with the one-shot HARQ-ACK feedback codebook has the low priority and the PUSCH has the high priority.

Example 13: the wireless communication device of examples 1, 2, 3, 4, or 5, wherein the processor is further configured to obtain first and second HARQ-ACK codebooks via a radio resource control (RRC) configuration and to provide one-shot HARQ-ACK feedback via the RRC configuration, and wherein the processor is further configured to apply a one-shot HARQ-ACK feedback configuration to both of the first and second HARQ-ACK codebooks.

Example 14: the wireless communication device of examples 1, 2, 3, 4, or 5, wherein the processor is further configured for use with first and second maximum numbers of CBGs per TB for first and second priorities, respectively, for a CC, and wherein the processor is further configured to set a number of HARQ-ACK bits for each TB for a one-shot HARQ feedback process for the particular CC based on a maximum value that is the greater of a number of HARQ-ACK bits configured for the first priority and a number of HARQ-ACK bits configured for the second priority.

Example 15: a method of wireless communication by a wireless device in a communications network, the method comprising: obtaining a plurality of HARQ-ACK codebooks, wherein the plurality of HARQ-ACK codebooks comprise priority-based HARQ-ACK codebooks of differing priorities and a separate one-shot HARQ-ACK codebook; and processing first and second physical uplink channels based at least in part on a priority of the first physical uplink channel and a priority of the second physical uplink channel, wherein one of the first and second physical uplink channels includes the one-shot HARQ-ACK codebook, and wherein the processing is performed in combination with the use of the priority-based HARQ-ACK codebooks.

Example 16: the method of example 15, wherein the priority-based HARQ-ACK codebooks comprise one or more of a Type 1 semi-static codebook and a Type 2 dynamic codebook; and wherein the one-shot HARQ-ACK codebook comprises a Type 3 codebook.

Example 17: the method of examples 15 or 16, wherein the processing the first and second physical uplink channels further comprises canceling one of the first and second physical uplink channels when the first and second physical uplink channels overlap in time based on a respective priority of each of the first and second physical uplink channels.

Example 18: the method of examples 15 or 16, wherein the processing of the first and second physical uplink channels further comprises multiplexing the first and second physical uplink channels when the first and second physical uplink channels overlap in time and are of equal priority.

Example 19: the method of examples 15, 16, 17, or 18, wherein the first and second physical uplink channels comprise one or more of a PUCCH and a PUSCH.

Example 20: the method of examples 15, 16, 17, 18, or 19, wherein the processing of the first and second physical uplink channels comprises: determining a priority for the first physical uplink channel; receiving DCI triggering the second physical uplink channel requesting the use of the one-shot HARQ-ACK codebook; assigning a priority to the second physical uplink channel; and canceling the first physical uplink channel when the first physical uplink channel has a lower priority compared to the second physical uplink channel, canceling the second physical uplink channel when the second physical uplink channel has a lower priority compared to the first physical uplink channel, and multiplexing the first and second physical uplink channels when both have equal priority.

Example 21: the method of examples 15, 16, 17, 18, 19, or 20, wherein the assigning the priority to the second physical uplink channel comprises assigning the second physical uplink channel a high priority irrespective of a priority indicator field of the DCI.

Example 22: the method of examples 15, 16, 17, 18, 19, or 20, wherein the assigning the priority to the second physical uplink channel comprises: determining whether the DCI includes an indication of priority; in response to the DCI including the indication of priority, selecting the priority for the second physical uplink channel based on the DCI; and in response to the DCI not including the indication of priority, selecting the priority for the second physical uplink channel based on a predetermined priority set to either low or high.

Example 23: the method of examples 15, 16, 17, 18, 19, 20, or 22, further comprising: receiving an additional DCI for the second physical uplink channel that requests the one-shot HARQ-ACK codebook and includes a priority indicator; and selecting the priority for the second physical uplink channel based on the priority indicator of the additional DCI.

Example 24: the method of examples 15, 16, 17, 18, 19, 20, or 22, further comprising: receiving an additional DCI that requests the one-shot HARQ-ACK codebook and includes a priority indicator different than the indication of priority in the DCI; and selecting the priority for the second physical uplink channel by assigning the second physical uplink channel a high priority.

Example 25: the method of examples 15, 16, 17, 18, 19, or 20, wherein the assigning the second physical uplink channel the priority comprises: setting the priority of the second physical uplink channel to a high priority when at least one reported HARQ-ACK bit in the one-shot HARQ-ACK codebook for a given HARQ process corresponding to a PDSCH that is scheduled by the DCI has a priority indicator field set to high priority; and setting the priority of the second physical uplink channel to low priority when the priority indicator field is set to low priority.

Example 26: the method of examples 15, 16, 17, 18, or 19, wherein at least one of the first or second physical uplink channels is a PUCCH with a one-shot HARQ-ACK codebook and the other of the first and second physical uplink channels is a PUSCH that time overlaps with the PUCCH, and wherein the processing of the first and second physical uplink channels comprises: multiplexing the PUCCH with the PUSCH when the PUCCH with the one-shot HARQ-ACK feedback codebook has a high priority and the PUSCH has a low priority; and multiplexing the PUCCH with the PUSCH when the PUCCH with the one-shot HARQ-ACK feedback codebook has the low priority and the PUSCH has the high priority.

Example 27: the method of examples 15, 16, 17, 18, or 19, further comprising: obtaining first and second HARQ-ACK codebooks via a RRC configuration; and applying the one-shot HARQ-ACK feedback configuration using the RCC configuration to both of the first and second HARQ-ACK codebooks.

Example 28: the method of examples 15, 16, 17, 18, or 19, wherein the wireless device is configured with first and second maximum numbers of CBGs per TB for first and second priorities, respectively, for a CC, and wherein the method further comprises setting a number of HARQ-ACK bits for each TB for a one-shot HARQ feedback process for the particular CC based on a maximum value that is the greater of a number of HARQ-ACK bits configured for the first priority and a number of HARQ-ACK bits configured for the second priority.

Example 29: an apparatus for use in a wireless communication device of a wireless communications network, comprising: means for obtaining a plurality of HARQ-ACK codebooks, wherein the plurality of HARQ-ACK codebooks comprise priority-based HARQ-ACK codebooks of differing priorities and a separate one-shot HARQ-ACK codebook; and means for processing first and second physical uplink channels based at least in part on a priority of the first physical uplink channel and a priority of the second physical uplink channel, wherein one of the first and second physical uplink channels includes the one-shot HARQ-ACK codebook, and wherein the processing is performed in combination with the use of the priority-based HARQ-ACK codebooks.

Example 30: an article of manufacture for use by a wireless communication device of a wireless communications network, the article comprising: a computer-readable medium having stored therein instructions executable by one or more processors of the wireless communication device to: obtain a plurality of HARQ-ACK codebooks, wherein the plurality of HARQ-ACK codebooks comprise priority-based HARQ-ACK codebooks of differing priorities and a separate one-shot HARQ-ACK codebook; and process first and second physical uplink channels based at least in part on a priority of the first physical uplink channel and a priority of the second physical uplink channel, wherein one of the first and second physical uplink channels includes the one-shot HARQ-ACK codebook, and wherein the processing is performed in combination with the use of the priority-based HARQ-ACK codebooks.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

While aspects and embodiments are described in this application by illustration to some examples, those skilled in the art will understand that additional implementations and use cases may come about in many different arrangements and scenarios. Features described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range across a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that features described herein may be practiced in a wide variety of devices, chip-level components, systems, distributed arrangements, end-user devices, etc. of varying sizes, shapes and constitution.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 16, 18, and 19-21 may be configured to perform one or more of the methods, features, or steps described herein. The algorithms described herein may also be efficiently implemented in software and/or embedded in hardware. Generally speaking, the various components, steps, features and/or functions illustrated in FIGS. 1-21 are not mutually exclusive.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A wireless communication device, comprising:
a transceiver;
a memory; and
a processor communicatively coupled to the transceiver and the memory, wherein the processor is configured to:
    process a first physical uplink channel and a second physical uplink channel based at least in part on a priority of the first physical uplink channel and a priority of the second physical uplink channel, wherein one of the first and second physical uplink channels includes a one-shot hybrid automatic repeat request (HARQ)-acknowledgment (ACK) codebook, and wherein the processing is performed in combination with a use of priority-based HARQ-ACK codebooks,
wherein at least one of the first physical uplink channel or the second physical uplink channel is a physical uplink control channel (PUCCH) and the other of the first physical uplink channel or the second physical uplink channel is a physical uplink shared channel (PUSCH) that time overlaps with the PUCCH, and wherein the processor is further configured to:
multiplex the PUCCH with the PUSCH when the PUCCH with the one-shot HARQ-ACK feedback codebook has a high priority and the PUSCH has a low priority; and
multiplex the PUCCH with the PUSCH when the PUCCH with the one-shot HARQ-ACK feedback codebook has the low priority and the PUSCH has the high priority.

2. The wireless communication device of claim 1,
wherein the priority-based HARQ-ACK codebooks are configured as one or more of a Type 1 semi-static codebook and a Type 2 dynamic codebook; and
wherein the one-shot HARQ-ACK codebook is configured as a Type 3 codebook.

3. The wireless communication device of claim 1,
wherein the processor is further configured to obtain a first HARQ-ACK codebook and a second HARQ-ACK codebook via a radio resource control (RRC) configuration and to provide one-shot HARQ-ACK feedback via the RRC configuration, and
wherein the processor is further configured to apply a one-shot HARQ-ACK feedback configuration to both of the first HARQ-ACK codebook and the second HARQ-ACK codebook.

4. The wireless communication device of claim 1,
wherein the processor is further configured for use with first and second maximum numbers of code block groups (CBGs) per transport block (TB) for a first priority and a second priority, respectively, for a component carrier (CC), and
wherein the processor is further configured to set a number of HARQ-ACK bits for each TB for a one-shot HARQ feedback process for the particular CC based on a maximum value that is the greater of a number of HARQ-ACK bits configured for the first priority and a number of HARQ-ACK bits configured for the second priority.

5. A method of wireless communication by a wireless device in a communications network, the method comprising:
processing a first physical uplink channel and a second physical uplink channel based at least in part on a priority of the first physical uplink channel and a priority of the second physical uplink channel, wherein one of the first physical uplink channel and second physical uplink channel includes a one-shot HARQ-ACK codebook, and wherein the processing is performed in combination with a use of priority-based HARQ-ACK codebooks,
wherein at least one of the first physical uplink channel or the second physical uplink channel is a physical uplink control channel (PUCCH) and the other of the first physical uplink channel or the second physical uplink channel is a physical uplink shared channel (PUSCH) that time overlaps with the PUCCH; and
wherein the processing of the first physical uplink channel and the second physical uplink channel further comprises:
multiplexing the PUCCH with the PUSCH in response to the PUCCH with the one-shot HARQ-ACK feedback codebook having a high priority and the PUSCH having a low priority; and
multiplexing the PUCCH with the PUSCH in response to the PUCCH with the one-shot HARQ-ACK feedback codebook having the low priority and the PUSCH having the high priority.

6. The method of claim 5,
wherein the priority-based HARQ-ACK codebooks comprise one or more of a Type 1 semi-static codebook and a Type 2 dynamic codebook; and
wherein the one-shot HARQ-ACK codebook comprises a Type 3 codebook.

7. The method of claim 5, further comprising:
obtaining a first HARQ-ACK codebook and a second HARQ-ACK codebook via a radio resource control (RRC) configuration; and
applying the one-shot HARQ-ACK feedback configuration using the RCC configuration to both of the first HARQ-ACK codebook and the second HARQ-ACK codebook.

8. The method of claim 5,
wherein the wireless device is configured with first and second maximum numbers of code block groups (CBGs) per transport block (TB) for a first priority and a second priority, respectively, for a component carrier (CC), and
wherein the method further comprises setting a number of HARQ-ACK bits for each TB for a one-shot HARQ feedback process for the particular CC based on a maximum value that is the greater of a number of HARQ-ACK bits configured for the first priority and a number of HARQ-ACK bits configured for the second priority.

9. An apparatus for use in a wireless communication device of a wireless communications network, comprising:
means for processing a first physical uplink channel and a second physical uplink channel based at least in part on a priority of the first physical uplink channel and a priority of the second physical uplink channel, wherein one of the first physical uplink channel and the second physical uplink channel includes a one-shot HARQ-ACK codebook, and wherein the processing is performed in combination with a use of priority-based HARQ-ACK codebooks,
wherein at least one of the first physical uplink channel or the second physical uplink channel is a physical uplink control channel (PUCCH) and the other of the first physical uplink channel or the second physical uplink channel is a physical uplink shared channel (PUSCH) that time overlaps with the PUCCH; and
wherein the means for processing further comprises:
means for multiplexing the PUCCH with the PUSCH when the PUCCH with the one-shot HARQ-ACK feedback codebook has a high priority and the PUSCH has a low priority; and
means for multiplexing the PUCCH with the PUSCH when the PUCCH with the one-shot HARQ-ACK feedback codebook has the low priority and the PUSCH has the high priority.

10. An article of manufacture for use by a wireless communication device of a wireless communications network, the article comprising:
a computer-readable medium having stored therein instructions executable by one or more processors of the wireless communication device to:
process a first physical uplink channel and a second physical uplink channel based at least in part on a priority of the first physical uplink channel and a priority of the second physical uplink channel, wherein one of the first physical uplink channel and second physical uplink channel includes a one-shot HARQ-ACK codebook, and wherein the processing is performed in combination with a use of priority-based HARQ-ACK codebooks, wherein at least one of the first physical uplink channel or the second physical uplink channel is a physical uplink control channel (PUCCH) and the other of the first physical uplink channel or the second physical uplink channel is a physical uplink shared channel (PUSCH) that time overlaps with the PUCCH, and wherein the processing of the first physical uplink channel and the second physical uplink channel further comprises:

multiplexing the PUCCH with the PUSCH when the PUCCH with the one-shot HARQ-ACK feedback codebook has a high priority and the PUSCH has a low priority; and multiplexing the PUCCH with the PUSCH when the PUCCH with the one-shot HARQ-ACK feedback codebook has the low priority and the PUSCH has the high priority.

11. A wireless communication device, comprising:
a transceiver;
a memory; and
a processor communicatively coupled to the transceiver and the memory, wherein the processor is configured to:
process a first physical uplink channel and a second physical uplink channel based at least in part on a priority of the first physical uplink channel and a priority of the second physical uplink channel, wherein one of the first physical uplink channel or the second physical uplink channel includes a one-shot HARQ-ACK codebook, and wherein the processing is performed in combination with a use of priority-based HARQ-ACK codebooks, wherein the processor is further configured to:
determine a priority for the first physical uplink channel;
receive downlink control information (DCI) triggering the second physical uplink channel requesting the use of the one-shot HARQ-ACK codebook;
assign a priority to the second physical uplink channel by assigning the second physical uplink channel a high priority based on a priority indicator field of the DCI; and
cancel the first physical uplink channel when the first physical uplink channel has a lower priority compared to the second physical uplink channel and cancel the second physical uplink channel when the second physical uplink channel has a lower priority compared to the first physical uplink channel.

12. The wireless communication device of claim 11,
wherein the priority-based HARQ-ACK codebooks are configured as one or more of a Type 1 semi-static codebook and a Type 2 dynamic codebook; and
wherein the one-shot HARQ-ACK codebook is configured as a Type 3 codebook.

13. The wireless communication device of claim 11,
wherein the processor is further configured for use with first and second maximum numbers of code block groups (CBGs) per transport block (TB) for a first priority and a second priority, respectively, for a component carrier (CC), and
wherein the processor is further configured to set a number of HARQ-ACK bits for each TB for a one-shot HARQ feedback process for the particular CC based on a maximum value that is the greater of a number of HARQ-ACK bits configured for the first priority and a number of HARQ-ACK bits configured for the second priority.

14. A method of wireless communication by a wireless communication device in a communications network, the method comprising:
processing a first physical uplink channel and a second physical uplink channel based at least in part on a priority of the first physical uplink channel and a priority of the second physical uplink channel, wherein one of the first physical uplink channel and second physical uplink channel includes a one-shot HARQ-ACK codebook, and wherein the processing is performed in combination with a use of priority-based HARQ-ACK codebooks, wherein the processing further comprises:
determining a priority for the first physical uplink channel;
receiving downlink control information (DCI) triggering the second physical uplink channel requesting the use of the one-shot HARQ-ACK codebook;
assigning a priority to the second physical uplink channel by assigning the second physical uplink channel a high priority based on a priority indicator field of the DCI; and
canceling the first physical uplink channel in response to the first physical uplink channel having a lower priority compared to the second physical uplink channel and canceling the second physical uplink channel in response to the second physical uplink channel having a lower priority compared to the first physical uplink channel.

15. The method of claim 14,
wherein the priority-based HARQ-ACK codebooks comprise one or more of a Type 1 semi-static codebook and a Type 2 dynamic codebook; and
wherein the one-shot HARQ-ACK codebook comprises a Type 3 codebook.

16. The method of claim 14,
wherein the wireless device is configured with first and second maximum numbers of code block groups (CBGs) per transport block (TB) for a first priority and a second priority, respectively, for a component carrier (CC), and
wherein the method further comprises setting a number of HARQ-ACK bits for each TB for a one-shot HARQ feedback process for the particular CC based on a maximum value that is the greater of a number of HARQ-ACK bits configured for the first priority and a number of HARQ-ACK bits configured for the second priority.

17. A wireless communication device, comprising:
a transceiver;
a memory; and
a processor communicatively coupled to the transceiver and the memory, wherein the processor is configured to:
process a first physical uplink channel and a second physical uplink channel based at least in part on a priority of the first physical uplink channel and a priority of the second physical uplink channel, wherein one of the first physical uplink channel or the second physical uplink channel includes a one-shot HARQ-ACK codebook, and wherein the processing is performed in combination with a usage of priority-based HARQ-ACK codebooks, wherein the wireless communication device is configured with (a) first and second maximum numbers of code block groups (CBGs) per transport block (TB) for a first priority and a second priority for a particular component carrier (CC) or (b) only a single CBG is configured, and wherein the processor is further configured to:

provide TB level ACK/NACK reporting for one-shot feedback without using CBG-based feedback for the one-shot feedback.

18. The wireless communication device of claim 17, wherein the priority-based HARQ-ACK codebooks are configured as one or more of a Type 1 semi-static codebook and a Type 2 dynamic codebook; and wherein the one-shot HARQ-ACK codebook is configured as a Type 3 codebook.

19. The wireless communication device of claim 17, wherein the processor is further configured for use with first and second maximum numbers of code block groups (CBGs) per transport block (TB) for the first priority and the second priority, respectively, for a component carrier (CC), and wherein the processor is further configured to set a number of HARQ-ACK bits for each TB for the one-shot HARQ feedback for the particular CC based on a maximum value that is the greater of a number of HARQ-ACK bits configured for the first priority and a number of HARQ-ACK bits configured for the second priority.

20. A method of wireless communication by a wireless communication device in a communications network, the method comprising:

configuring the wireless communication device with (a) first and second maximum numbers of code block groups (CBGs) per transport block (TB) for a first priority and a second priority for a particular component carrier (CC) or configuring (b) only a single CBG; and processing a first physical uplink channel and a second physical uplink channel based at least in part on a priority of the first physical uplink channel and a priority of the second physical uplink channel, wherein one of the first physical uplink channel and second physical uplink channel includes a one-shot HARQ-ACK codebook, and wherein the processing is performed in combination with a use of priority-based HARQ-ACK codebooks; and wherein the processing further comprises providing TB level ACK/NACK reporting for one-shot feedback without using CBG-based feedback for the one-shot feedback.

21. The method of claim 20, wherein the priority-based HARQ-ACK codebooks comprise one or more of a Type 1 semi-static codebook and a Type 2 dynamic codebook; and wherein the one-shot HARQ-ACK codebook comprises a Type 3 codebook.

22. The method of claim 20, wherein the wireless device is configured with first and second maximum numbers of code block groups (CBGs) per transport block (TB) for the first priority and the second priority, respectively, for a component carrier (CC), and wherein the method further comprises setting a number of HARQ-ACK bits for each TB for the one-shot HARQ feedback for the particular CC based on a maximum value that is the greater of a number of HARQ-ACK bits configured for the first priority and a number of HARQ-ACK bits configured for the second priority.

* * * * *